(12) United States Patent
Levy et al.

(10) Patent No.: US 9,807,921 B2
(45) Date of Patent: Nov. 7, 2017

(54) AGRICULTURAL ROW UNIT SYSTEMS, METHODS, AND APPARATUS

(71) Applicant: PRECISION PLANTING LLC, Tremont, IL (US)

(72) Inventors: Kent Levy, Morton, IL (US); Jeremy Hodel, Morton, IL (US); Ian Radtke, Washington, IL (US)

(73) Assignee: Precision Planting LLC, Tremont, IL (US)

( * ) Notice: Subject to any disclaimer, the term of this patent is extended or adjusted under 35 U.S.C. 154(b) by 0 days.

(21) Appl. No.: 14/437,975

(22) PCT Filed: Oct. 24, 2013

(86) PCT No.: PCT/US2013/066624
§ 371 (c)(1),
(2) Date: Apr. 23, 2015

(87) PCT Pub. No.: WO2014/066643
PCT Pub. Date: May 1, 2014

(65) Prior Publication Data
US 2015/0319919 A1 Nov. 12, 2015

Related U.S. Application Data

(60) Provisional application No. 61/718,051, filed on Oct. 24, 2012.

(51) Int. Cl.
*A01C 7/04* (2006.01)
*A01C 7/20* (2006.01)
(Continued)

(52) U.S. Cl.
CPC .............. *A01C 7/127* (2013.01); *A01C 7/046* (2013.01); *A01C 7/208* (2013.01); *A01C 15/006* (2013.01)

(58) Field of Classification Search
CPC ........... A01C 7/046; A01C 7/04; A01C 7/127; A01C 15/006
(Continued)

(56) References Cited

U.S. PATENT DOCUMENTS 1,886,149 A 11/1932 Beall
4,359,952 A * 11/1982 Gesior ..................... A01C 7/06
111/186
(Continued)

FOREIGN PATENT DOCUMENTS

| EP | 2420120 A1 | 2/2012 |
|---|---|---|
| WO | 2012129442 A2 | 9/2012 |
| WO | 2013049198 A1 | 4/2013 |

OTHER PUBLICATIONS

European Search Report, Issued Jul. 7, 2016, pp. 1-8.
International Search Report, Issued Mar. 21, 2014, pp. 1-9.

*Primary Examiner* — John G Weiss
(74) *Attorney, Agent, or Firm* — Thomas J. Oppold; Larkin Hoffman Daly & Lindgren, Ltd.

(57) ABSTRACT

A row unit for an agricultural planter having features for releasably operably coupling a seed meter of the row unit to a seed deposition apparatus of the row unit such as a seed conveyor, seed tube or the like. Apparatus are provided for tipping a seed meter of the hopper for disengagement from the seed deposition apparatus. Apparatus are provided for biasing the seed deposition apparatus into operative engagement with the seed meter. The row unit includes features such as latches for releasably operably coupling the row unit to crop input and vacuum supply lines. Apparatus are provided for tipping a seed meter of the hopper for disengagement from the crop input and vacuum supply lines. Systems are provided for supplying vacuum and crop inputs to the seed meter via the releasably engageable apparatus.

25 Claims, 27 Drawing Sheets

(51) Int. Cl.
*A01C 7/12* (2006.01)
*A01C 15/00* (2006.01)

(58) Field of Classification Search
USPC .................. 111/170–176, 183–185, 64, 65
See application file for complete search history.

(56) References Cited

U.S. PATENT DOCUMENTS

| | | | |
|---|---|---|---|
| 4,382,528 A | 5/1983 | Gaffird et al. | |
| 4,485,939 A * | 12/1984 | Gafford | A01C 15/006 |
| | | | 111/73 |
| 4,715,515 A * | 12/1987 | Steilen | A01C 15/006 |
| | | | 111/77 |
| 4,884,724 A | 12/1989 | Schmidt | |
| 5,351,634 A | 10/1994 | Patton | |
| 5,392,722 A | 2/1995 | Sniped et al. | |
| 6,109,193 A * | 8/2000 | Crabb | A01C 7/046 |
| | | | 111/185 |
| 6,401,638 B1 * | 6/2002 | Crabb | A01C 7/046 |
| | | | 111/185 |
| 6,581,532 B1 * | 6/2003 | Hagen | A01B 73/048 |
| | | | 111/170 |
| 6,595,148 B2 * | 7/2003 | Meyer | A01C 7/042 |
| | | | 111/24 |
| 7,631,606 B2 * | 12/2009 | Sauder | A01C 7/126 |
| | | | 111/171 |

\* cited by examiner

AGRICULTURAL ROW UNIT SYSTEMS, METHODS, AND APPARATUS

BACKGROUND

In recent years, growers of corn and other crops have come to recognize the importance of planting individual seeds at the appropriate spacing. Due to the time constraints caused by field conditions and weather, modern row units have been developed that include features which improve seed singulation and spacing even at higher speeds. However, the time required to set up these features for planting can delay planting operations, as can errors in planter setup which interfere with operation. Thus, there is a need for a row unit having improved setup features allowing for more efficient and effective configuration of the row unit prior to planting operations.

DESCRIPTION OF THE DRAWINGS

FIG. 10B is an enlarged detailed view of the circled portion of the agricultural row unit of FIG. 10A.

DESCRIPTION

Figure 1A:
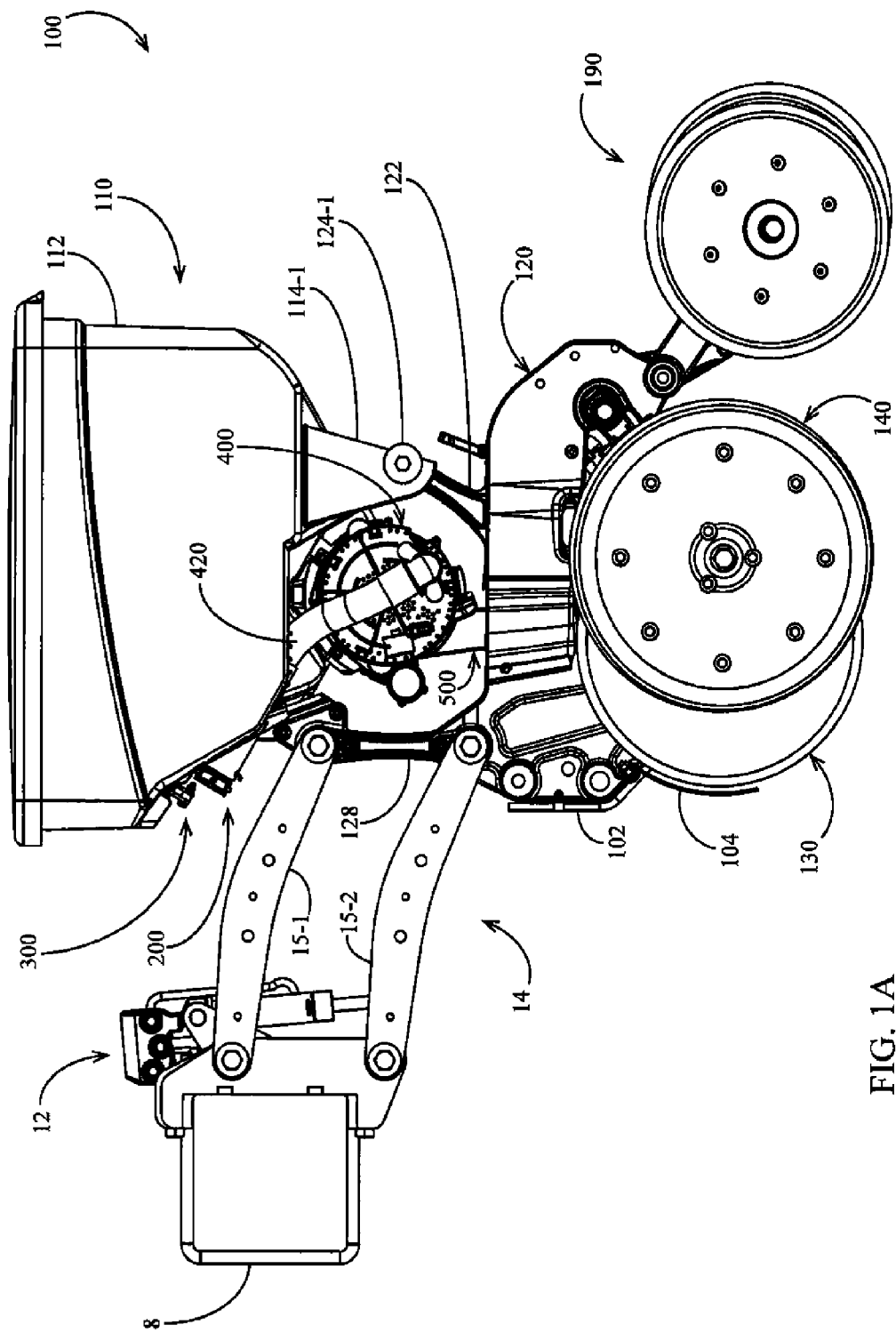
FIG. 1A is a left side elevation view of an embodiment of an agricultural row unit in an operating position.
Figure 1B:
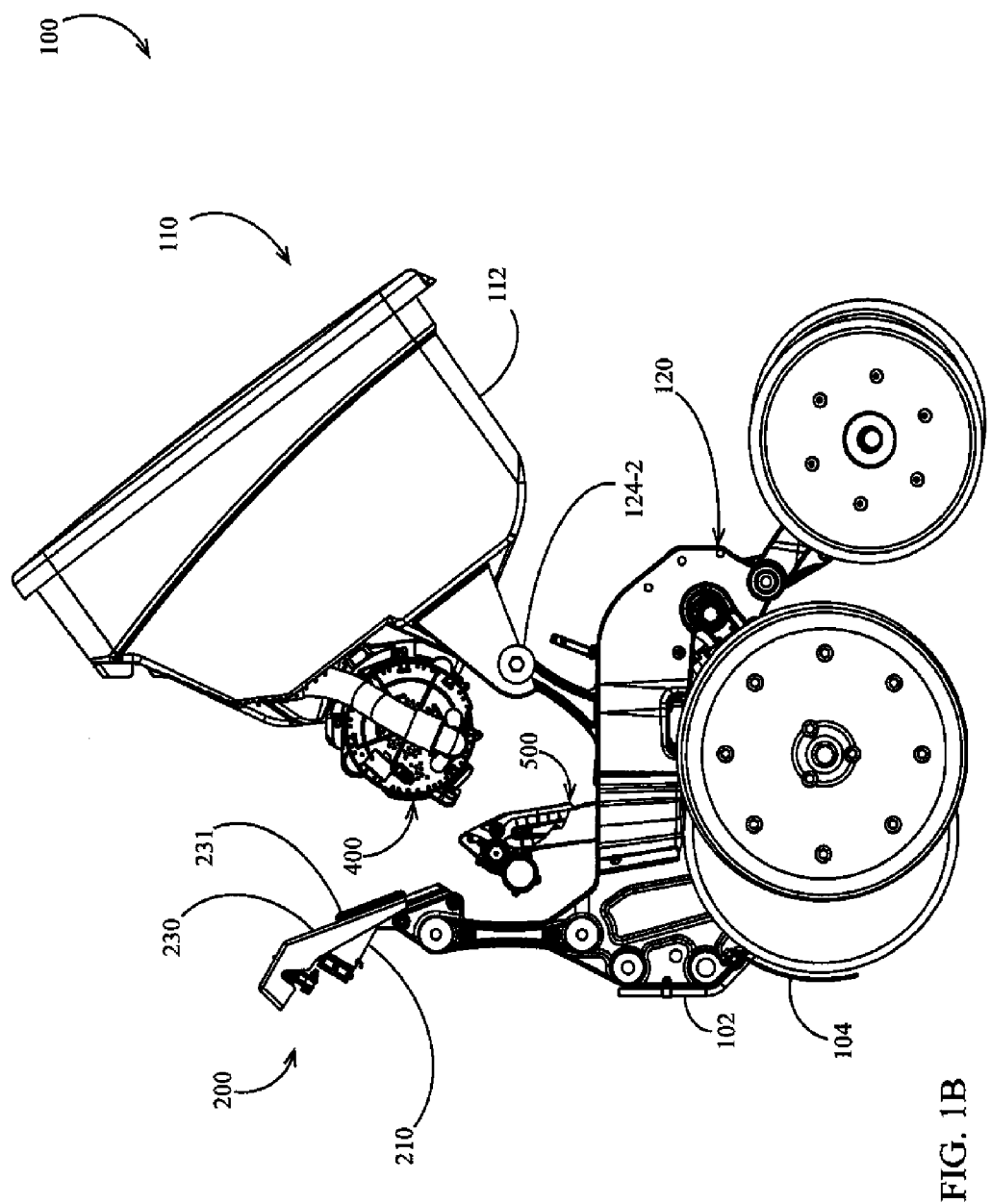
FIG. 1B is a left side elevation view of the agricultural row unit of FIG. 1A in a partially disassembled position.
Figure 1C:
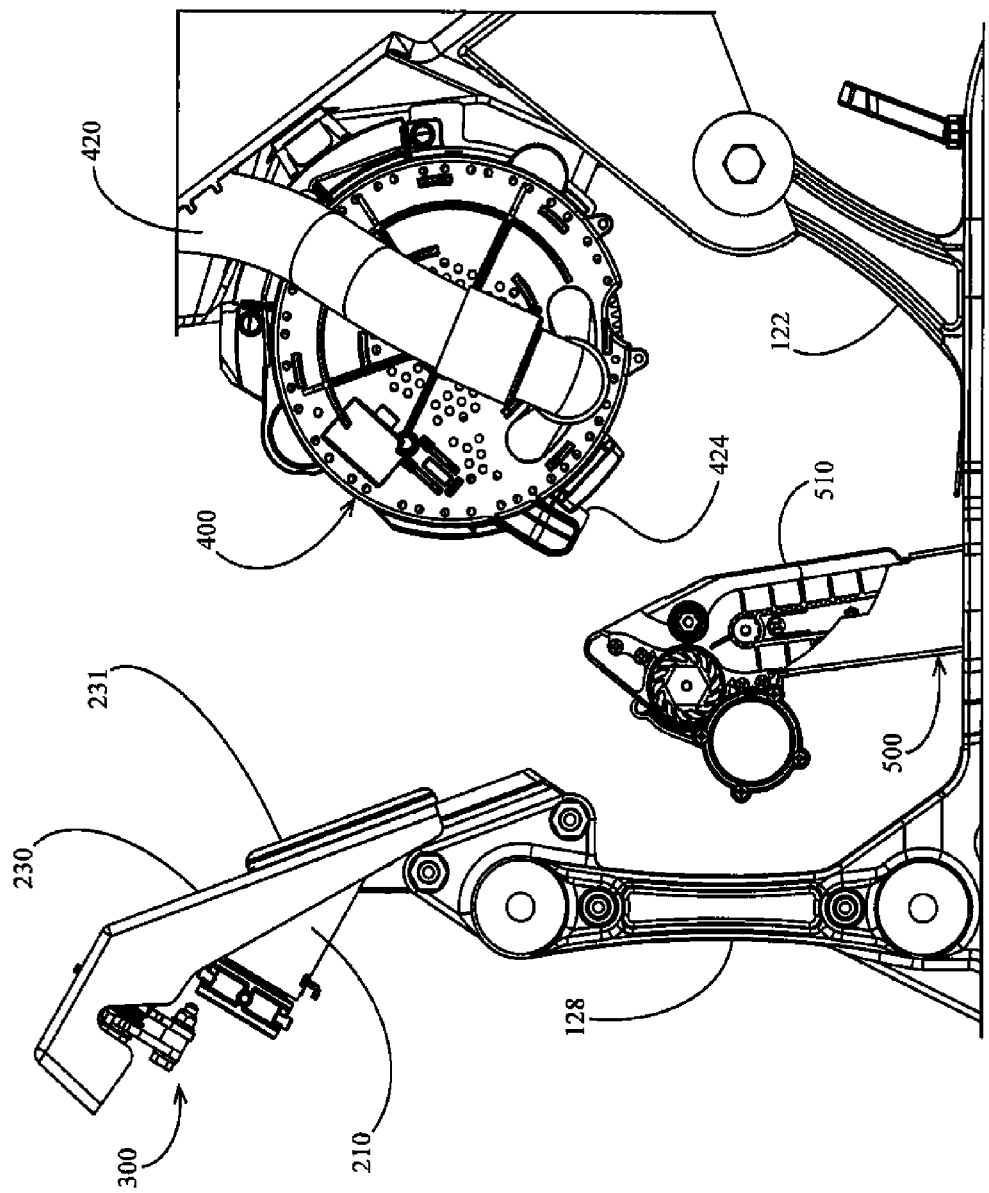
FIG. 1C is an enlarged partial left side elevation view of the agricultural row unit of FIG. 1B.
Figure 2A:
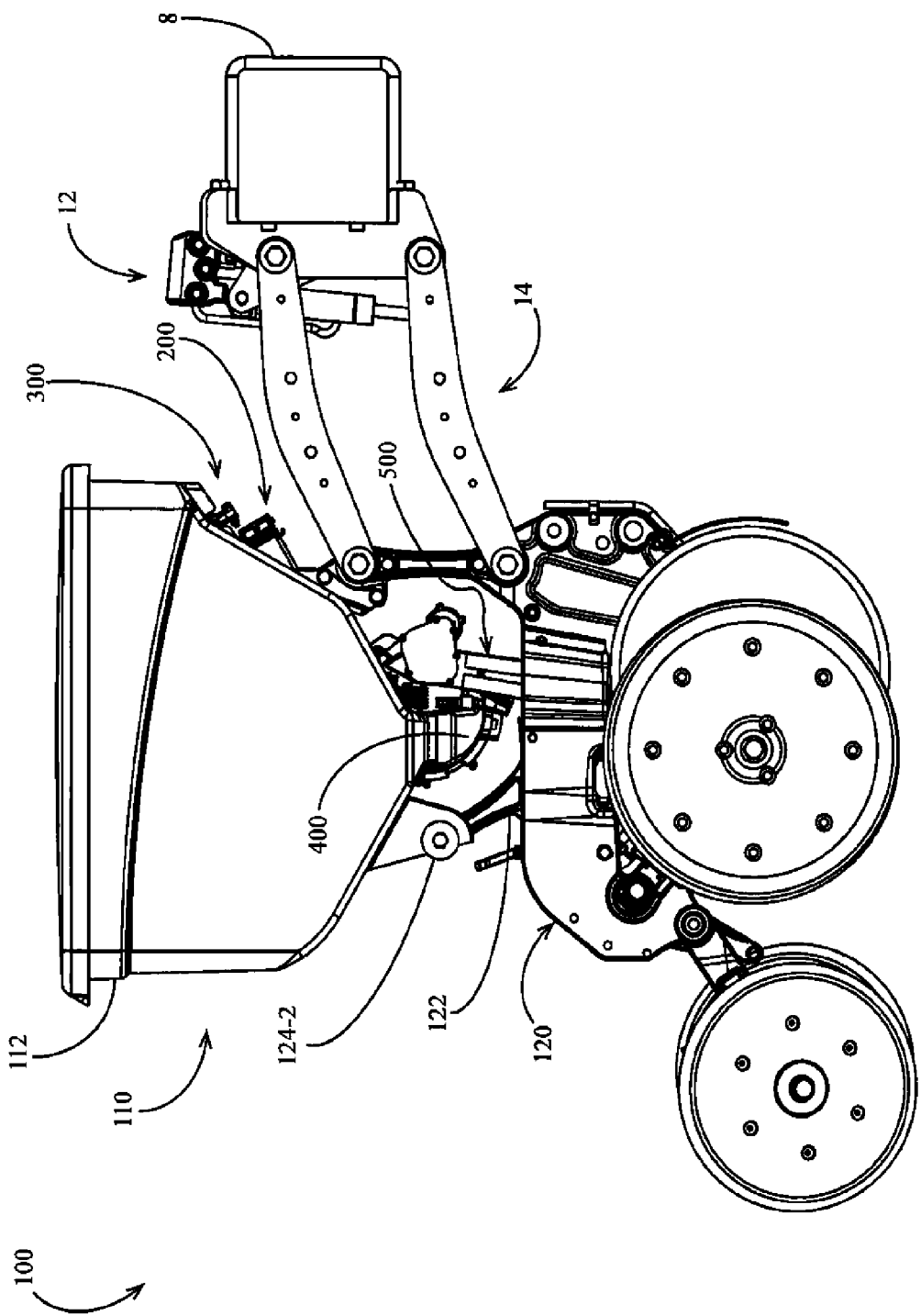
FIG. 2A is a right side elevation view of the agricultural row unit of FIG. 1A in the operating position.
Figure 2B:
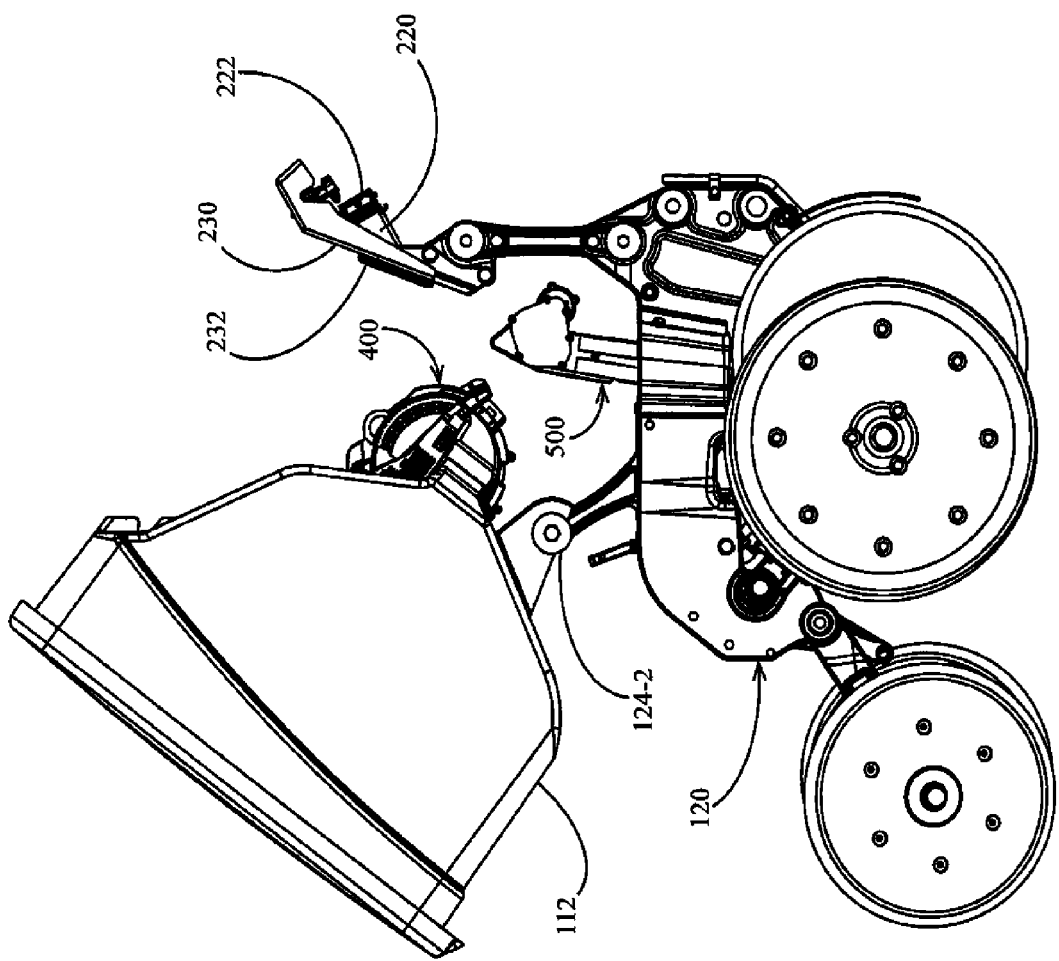
FIG. 2B is a right side elevation view of the agricultural row unit of FIG. 2A in the partially disassembled position.
Figure 2C:
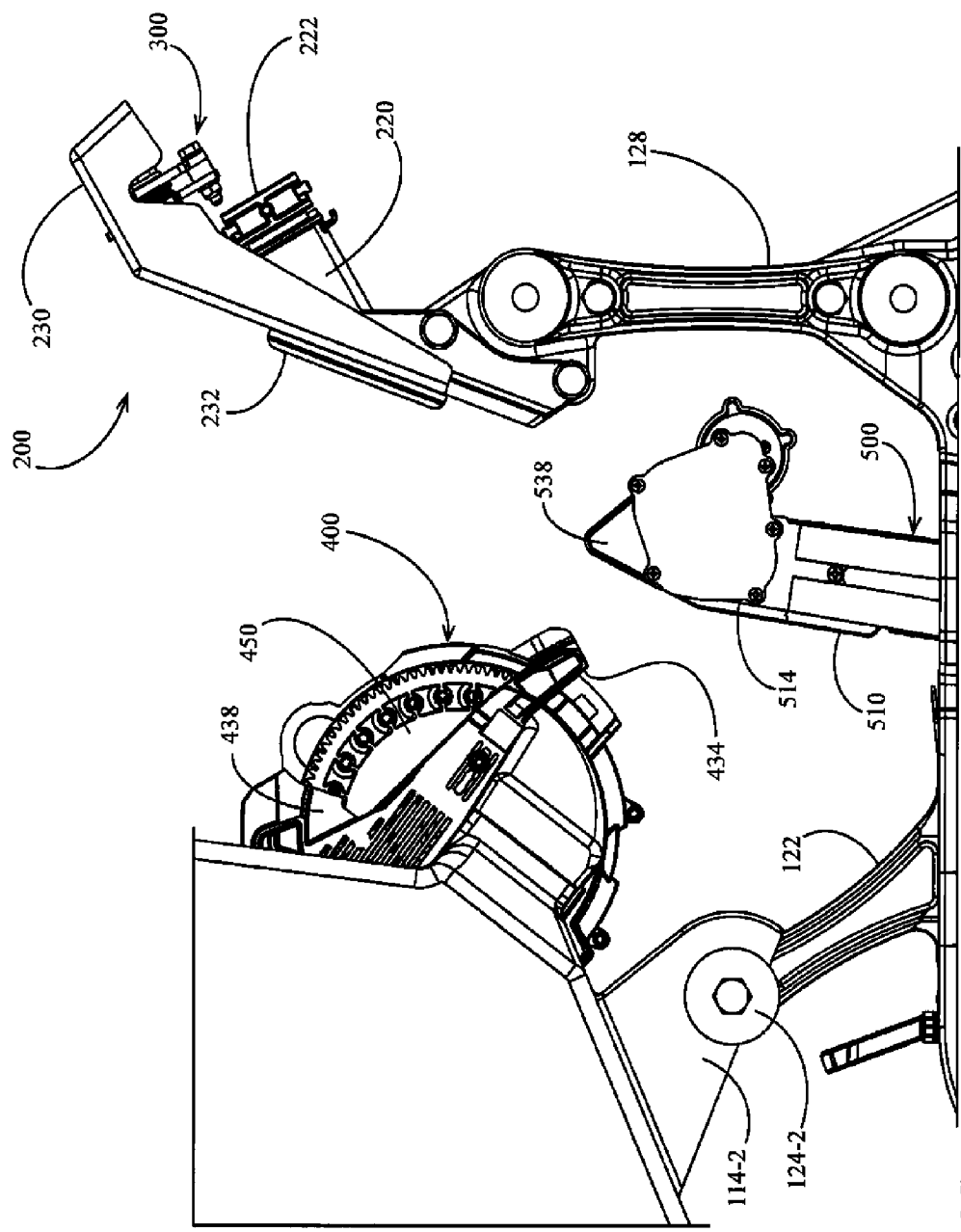
FIG. 2C is an enlarged partial right side elevation view of the agricultural row unit of FIG. 2B.

Referring now to the drawings, wherein like reference numerals designate identical or corresponding parts throughout the several views, FIG. 1A illustrates an agricultural implement, e.g., a planter, comprising a toolbar 8 to which multiple row units 100 are mounted in transversely spaced relation. Each row unit 100 is preferably mounted to the toolbar 8 by a parallel arm arrangement 14 including upper and lower parallel arm pairs 15-1,15-2, respectively, such that the row unit is permitted to translate vertically with respect to the toolbar. The row unit 100 preferably includes a frame 120 including a forward mounting post 128 and a rearward mounting post 122. The upper and lower parallel arm pairs 15-1,15-2 are preferably pivotally mounted at a rearward end to the forward mounting post 128. The row unit 100 preferably includes an opening disc assembly 130 including two angled discs rollingly mounted to a shank 165 (FIG. 10A) of the frame 120 and disposed to open a v-shaped trench in the soil as the row unit traverses a field. A knife 170 (FIG. 10A) is preferably removably mounted to the shank 165. The knife 170 is configured to compress and shape the bottom of the furrow opened by the opening disc assembly 130. A guard 104 is preferably mounted to the row unit frame 120 via a guard support 102 mounted to the row unit frame. The guard 104 is preferably configured to prevent soil and debris from passing between the opening discs of the opening disc assembly 130. The row unit 100 preferably includes a gauge wheel assembly 140 including two gauge wheels 142 (FIG. 5) pivotally mounted to the frame 120 and disposed to roll along the surface of the soil, thus limiting the depth of the trench opened by the opening disc assembly 130. A downforce actuator 12 is preferably pivotally mounted to the toolbar 8 at a first end and at a second end to the parallel arm arrangement 14. The downforce actuator is preferably configured to impose a controlled downforce on the row unit 100 such that full trench depth is maintained. A closing wheel assembly 190 comprising two closing wheels is preferably pivotally coupled to the frame 120 and disposed to move displaced soil back into the trench.

Continuing to refer to FIG. 1A, seeds are communicated from a hopper 110 to a seed meter 400 preferably configured to singulate the supplied seeds. The meter 400 is preferably a vacuum-type meter such as that disclosed in Applicant's co-pending international patent application no. PCT/US2012/030192 (Pub. No. WO/2012/129442), the disclosure of which is hereby incorporated by reference herein in its entirety. A vacuum is imposed within the meter 400 by movement of air through a vacuum line 420 in fluid communication with the meter.

Referring to FIGS. 1A through 3C, the hopper 110 is preferably pivotally mounted to the frame 120. The hopper 110 preferably includes a seed storage bin 112 and left and right attachment arms 114-1,114-2, respectively. The left and right attachment arms 114-1,114-2 are preferably releasably pivotally coupled to left and right pivot 124-1,124-2, respectively. The pivots 124 are preferably mounted to the rearward mounting post 122. Each pivot 124 preferably includes a plastic cylinder partially engaged by a semi-circular surface of the associated attachment arm 114.

The meter 400 is preferably removably mounted to the hopper 110. In operation, the seed meter 400 preferably deposits the supplied seeds into a seed conveyor 500 such as that disclosed in Applicant's co-pending international patent application no. PCT/US2012/57327, the disclosure of which is hereby incorporated by reference herein in its entirety. The seed conveyor 500 is preferably removably mounted to the frame 120 and preferably conveys seeds deposited by the meter 400 to a lower end of the conveyor and deposits the seeds into the trench. As discussed further herein with respect to FIGS. 12A-12C, in some embodiments the seed conveyor 500 is replaced with a seed tube 800. In such embodiments, seeds deposited by the meter 400 fall through the seed tube 800 into the trench.

Figure 10A:
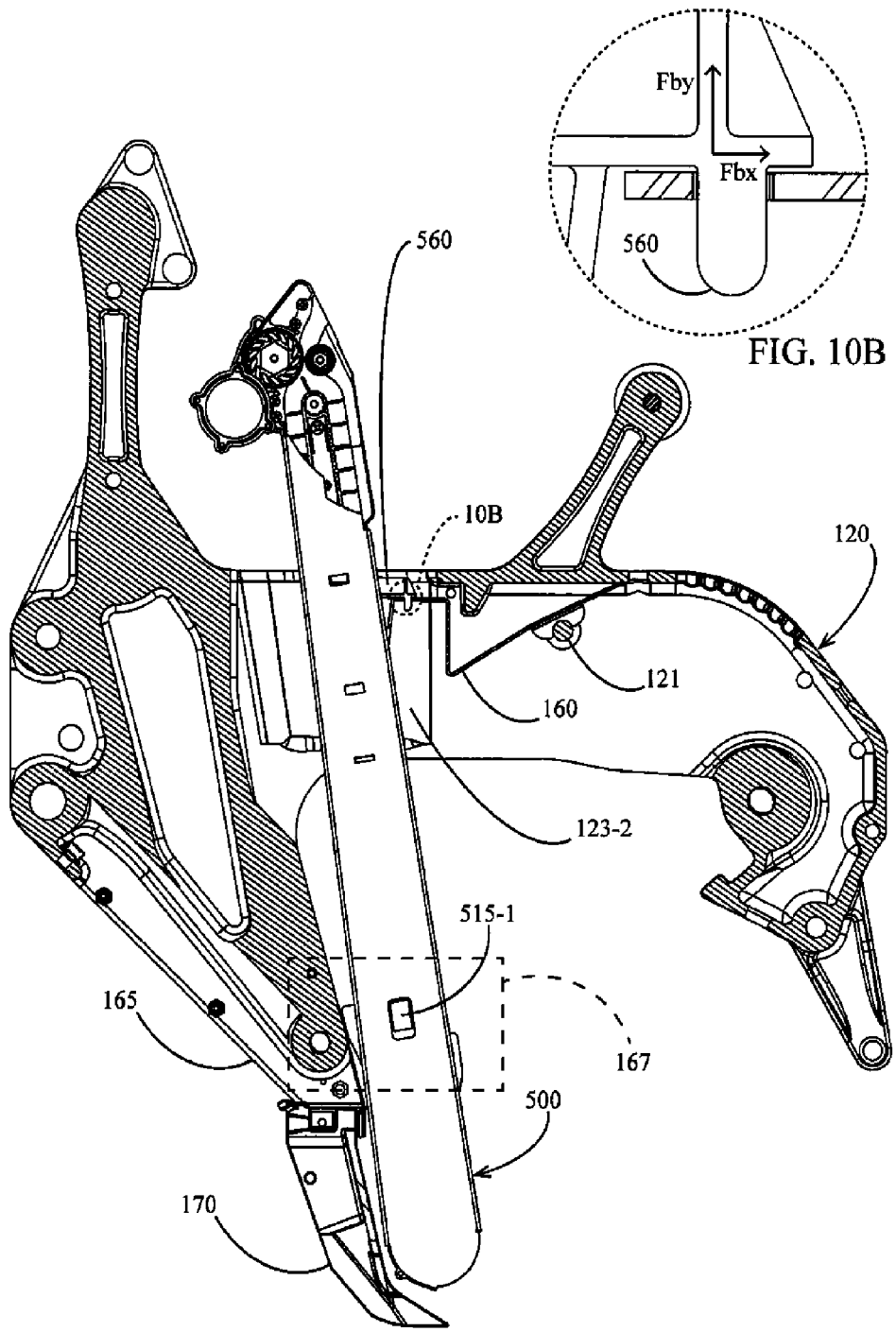
FIG. 10A is a view of the agricultural row unit of FIG. 1A along the section 10-10 of FIG. 5.

Referring to FIG. 10A, the seed conveyor 500 is preferably positioned in an opening between opposing sidewalls 123 of the row unit frame 120. The seed conveyor 500 preferably includes left and right protrusions 515 which partially constrain the position of the seed conveyor 500 by contacting a bracket 167 mounted to the shank 165 at a forward end and extending rearward to partially enclose the seed conveyor.

As discussed in detail elsewhere herein, as the hopper 110 is rotated rearward (clockwise on the view of FIG. 1B) about the pivots 124, the meter 400 rotates with the hopper 110 and disengages from the seed conveyor 500. Likewise, as the hopper 110 is rotated forward (counter-clockwise on the view of FIG. 1B) about the pivots 124, the meter 400 rotates with the hopper 110 and engages the seed conveyor 500.

Supply Coupler Assembly

Figure 3A:
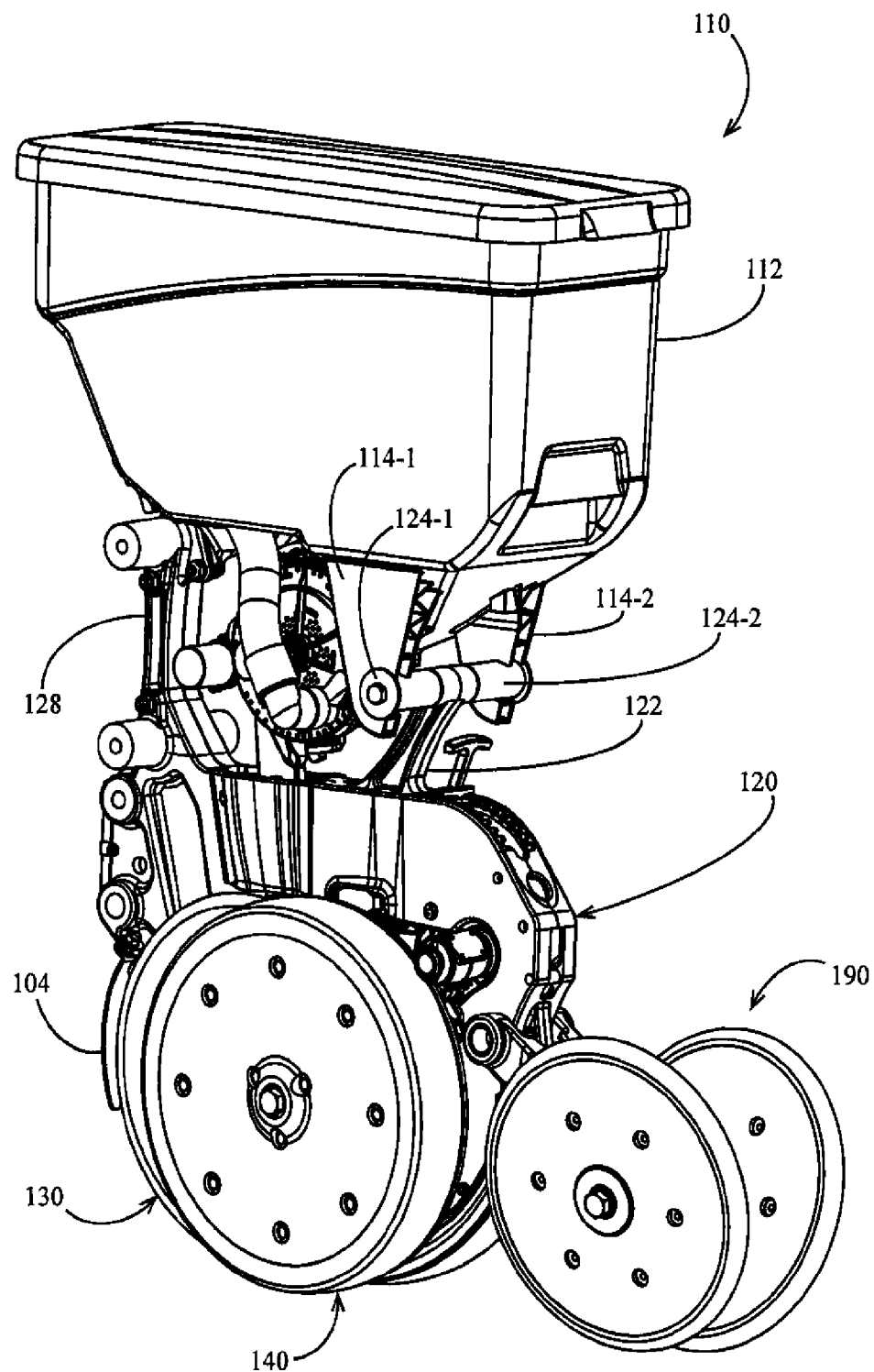
FIG. 3A is a rear perspective view of the agricultural row unit of FIG. 1A in the operating position.
Figure 3B:
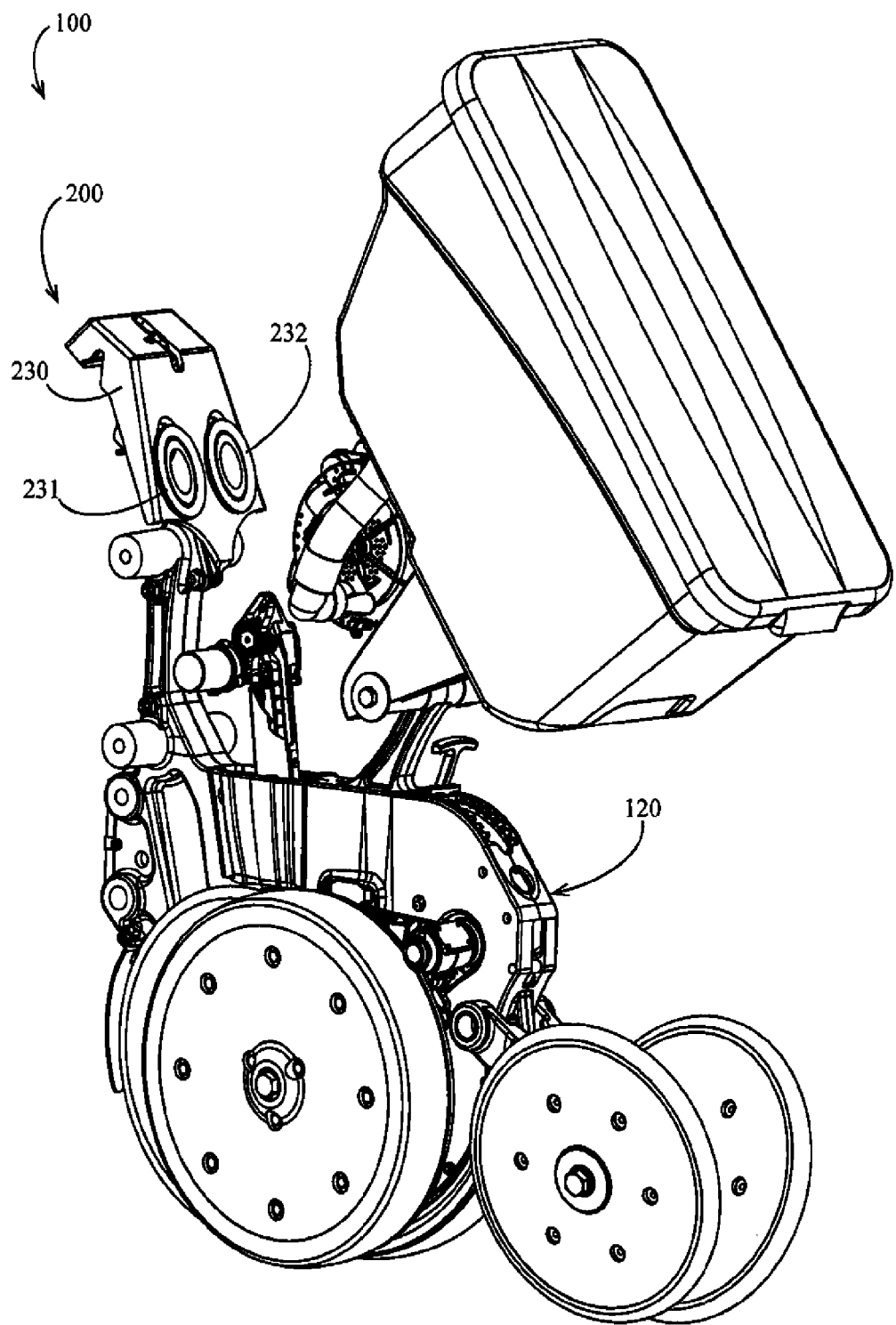
FIG. 3B is a rear perspective view of the agricultural row unit of FIG. 3A in the partially disassembled position.
Figure 3C:
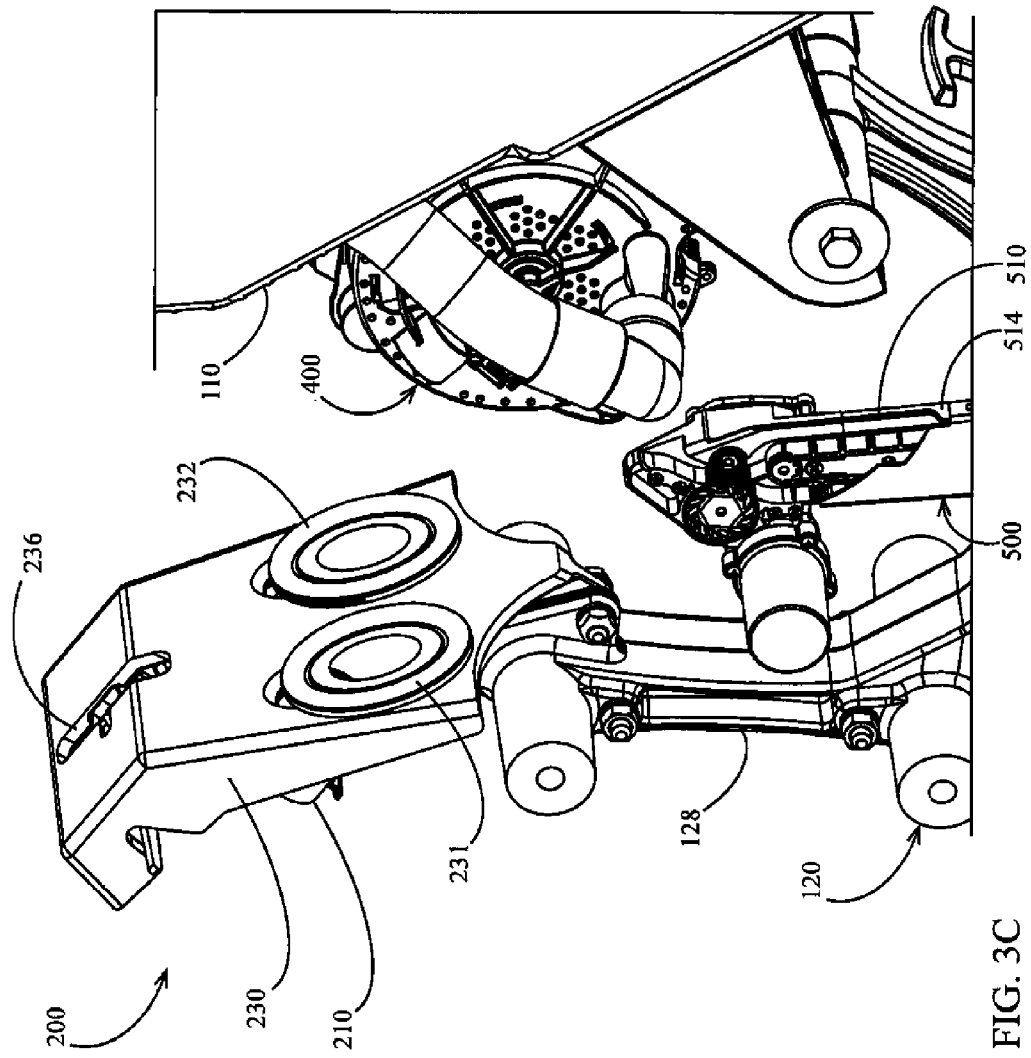
FIG. 3C is an enlarged partial rear perspective view of the agricultural row unit of FIG. 3B.
Figure 4A:
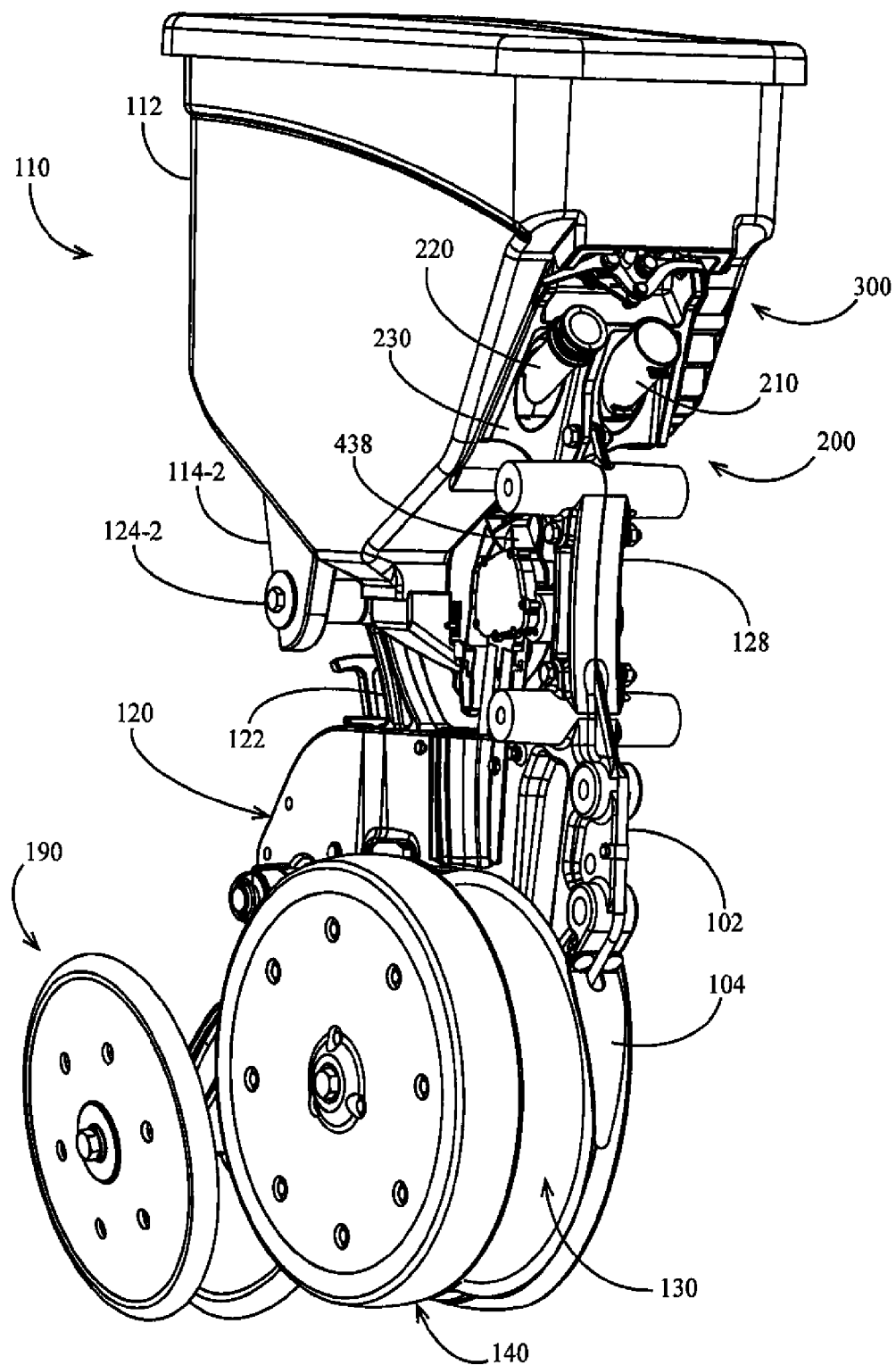
FIG. 4A is a front perspective view of the agricultural row unit of FIG. 1A in the operating position.
Figure 4B:
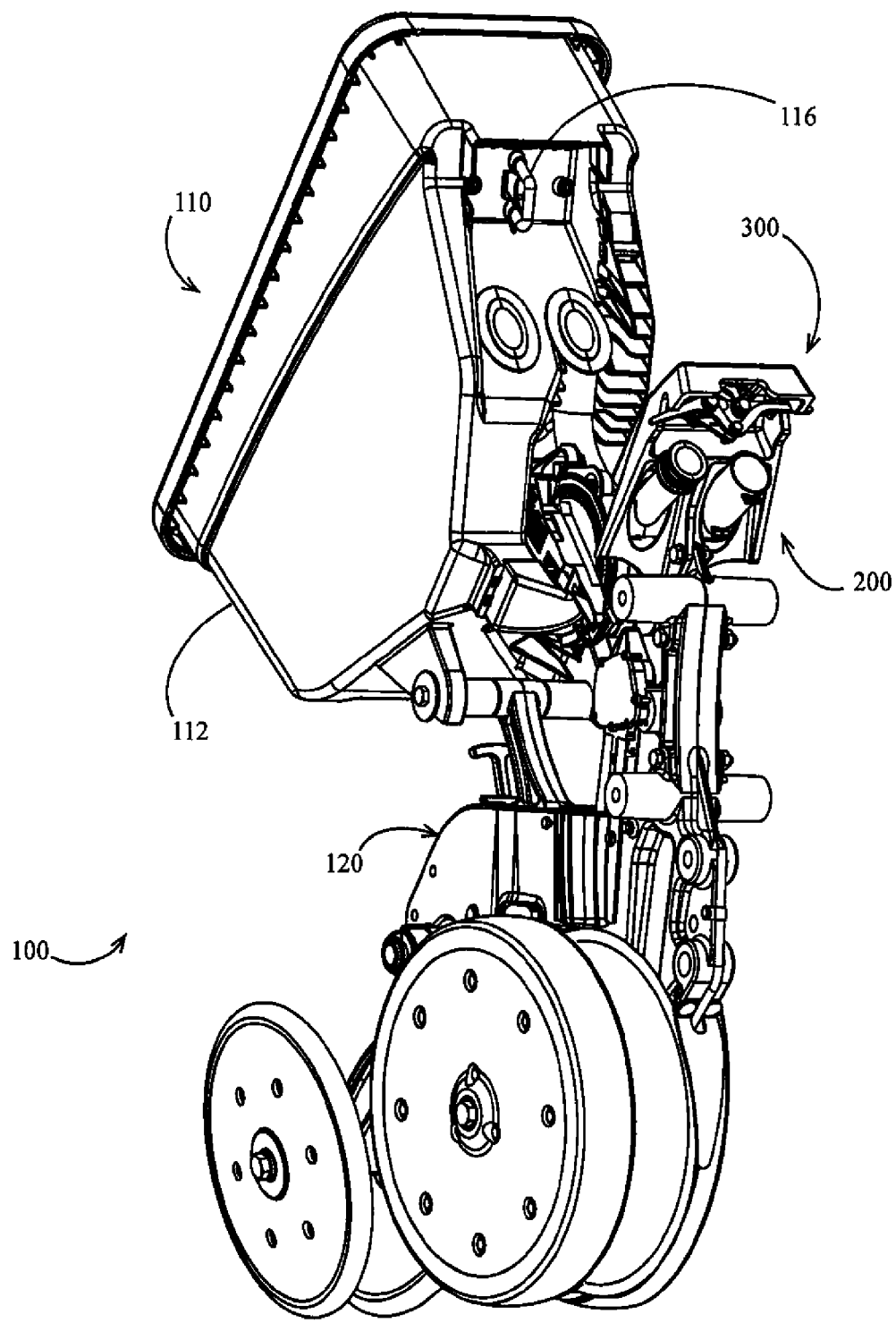
FIG. 4B is a front perspective view of the agricultural row unit of FIG. 4A in the partially disassembled position.
Figure 4C:
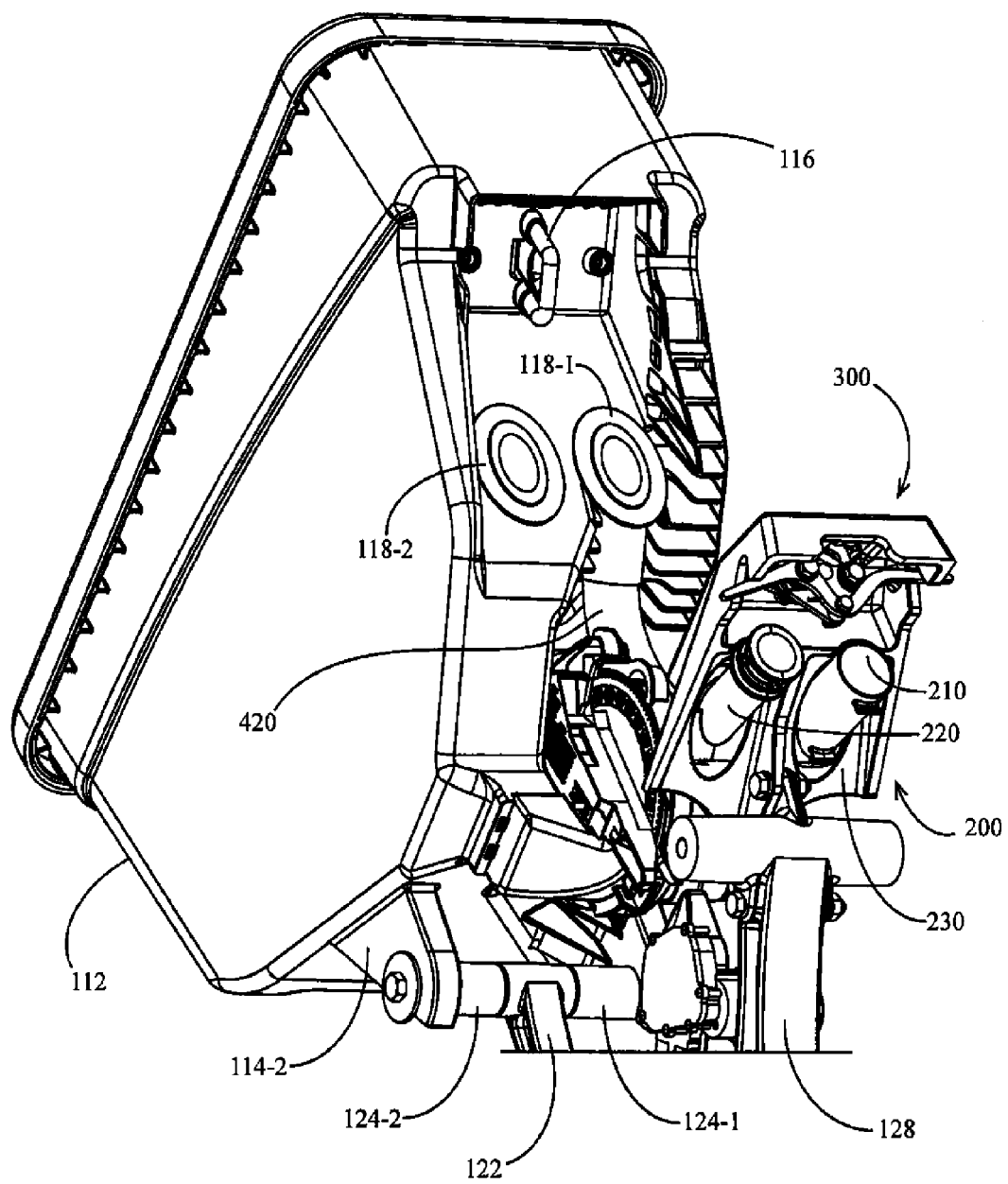
FIG. 4C is an enlarged partial front perspective view of the agricultural row unit of FIG. 4B.

Turning to FIGS. 3C and 4C, a supply coupler assembly 200 is preferably mounted to the frame 120. The supply coupler assembly 200 preferably includes a coupler frame 230, which is preferably mounted to an upper end of the forward mounting post 128. Referring to FIG. 4C, a vacuum conduit 210 and a seed supply conduit 220 are preferably mounted to a forward side of the coupler frame 230 such that the vacuum and seed supply conduits extend forward from the coupler frame. Referring to FIG. 3C, a rearward opening in the vacuum conduit 210 is circumferentially surrounded by a seal 231. Referring to FIG. 4C, as the hopper 110 is rotated forward (clockwise on the view of FIG. 2C) about the pivots 124 to the operating position (i.e., that illustrated in FIG. 2A), a plate 118-1 mounted to the hopper 110 preferably contacts the seal 231. The plate 118-1 preferably includes an aperture in fluid communication with the vacuum line 420. Thus in the operating position, the plate 118-1 and the seal 231 cooperate to releasably place the vacuum conduit 210 in fluid communication with the vacuum line 420.

Referring again to FIG. 3C, a rearward opening in the seed supply conduit 220 is circumferentially surrounded by a seal 232. Referring to FIG. 4C, as the seed hopper 110 is rotated forward to the operating position, a plate 118-2 mounted to the hopper 110 preferably contacts the seal 232. The plate 118-2 preferably includes an aperture in fluid communication with a seed storage bin 112 of the hopper 110. Thus in the operating position, the plate 118-2 and the seal 232 cooperate to releasably place the seed supply conduit 220 in fluid communication with the interior or the seed storage bin 112.

Referring to FIG. 4C, a latch 300 preferably releasably latches the hopper 110 to the coupler assembly 200. The latch 300 is preferably a push-to-close latch such as model no. R4-20-20-501-10 available from Southco in Concordville, Pa. As the hopper 110 is rotated toward the operating position, a hook 116 preferably enters a slot 236 (FIG. 3C) formed in the coupler frame 230. When the hopper 110 is in the operating position, the latch 300 preferably engages the hook 116 such that the hopper 110 is latched in the operating position. When the latch 300 is engaged, the seals 131,132 are preferably compressed between the plates 118-1,118-2, respectively and the coupler frame 230. When the latch 300 is released, e.g., by manipulation of lever 310 (FIG. 5), the hopper 110 is allowed to tip rearwardly such that the seals 131,132 separate from the plates 118-1,118-2.

Figure 11:
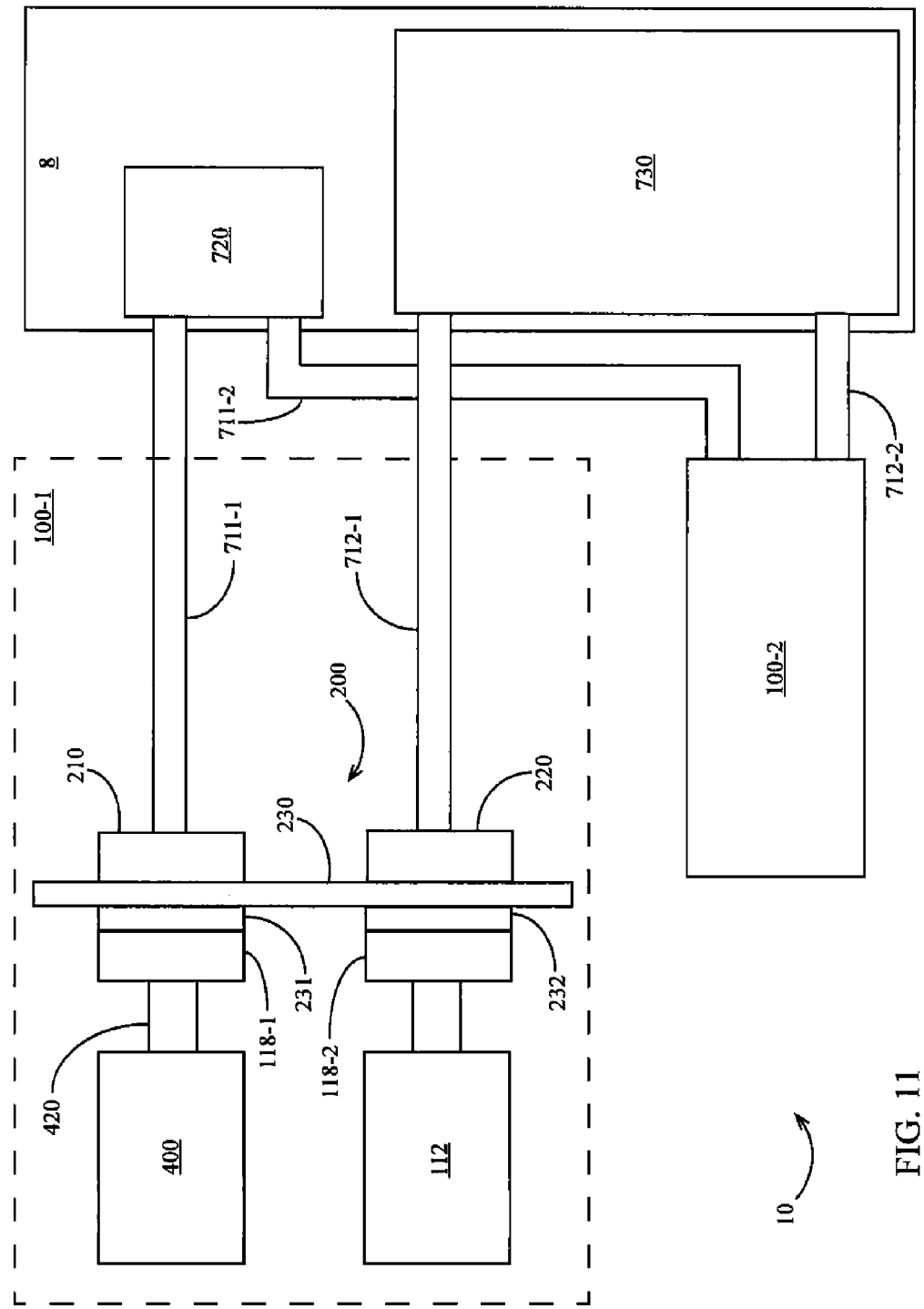
FIG. 11 schematically illustrates an embodiment of a planter 10.

Turning to FIG. 11, the supply coupler assembly 200 is illustrated schematically on a planter 10 having multiple row units 100 transversely spaced along the toolbar 8. Each seed supply conduit 220 is preferably in fluid communication with a bulk seed hopper 730 via a seed supply line 712. The bulk seed hopper 730 is preferably supported by the toolbar 8. The bulk seed hopper 730 is preferably configured to pneumatically supply seed (e.g., using a blower and manifold as described in U.S. Pat. No. 5,392,722) to each hopper 110. Each vacuum conduit 210 is preferably in fluid communication with a vacuum source 720 (e.g., an impellerdriven vacuum pump) via a vacuum line 711.

Figure 5:
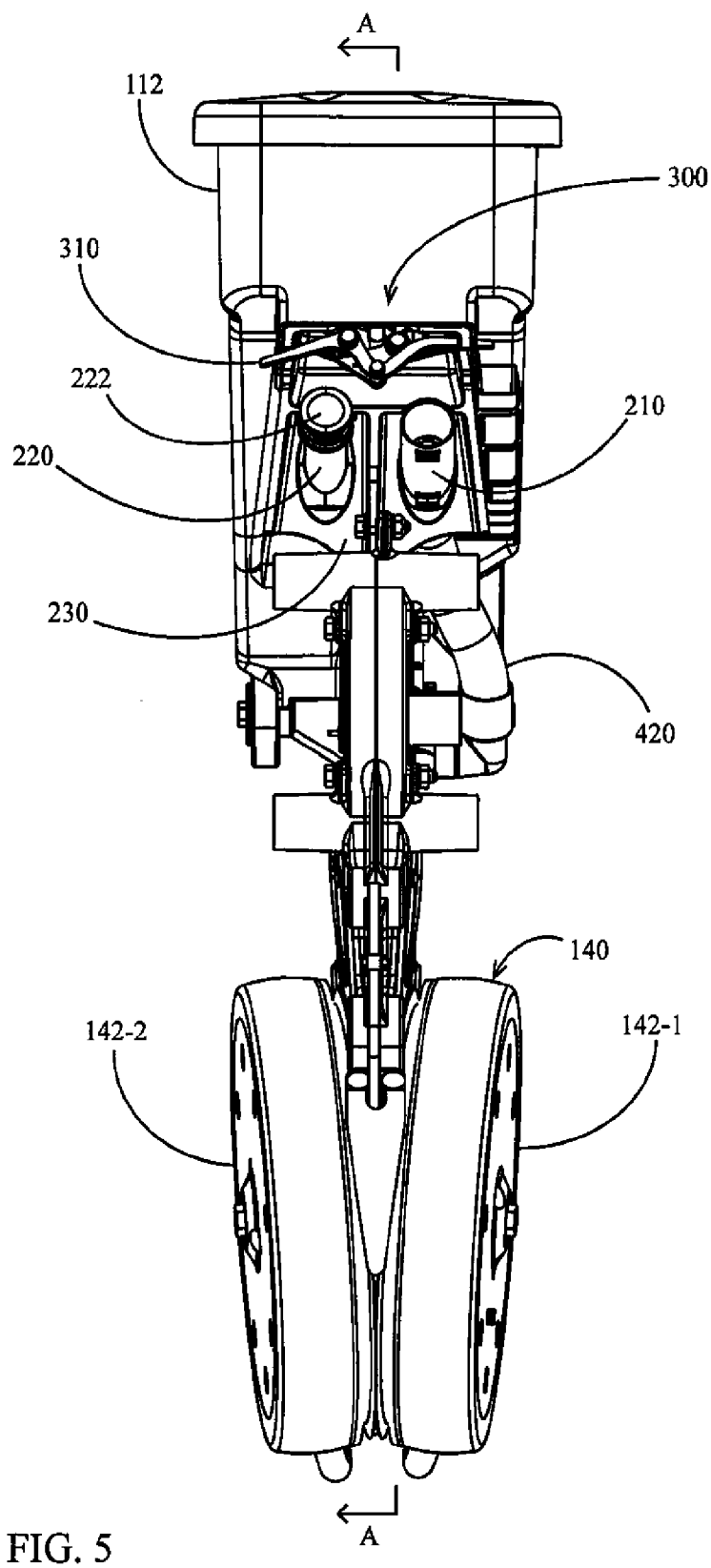
FIG. 5 is a front elevation view of the agricultural row unit of FIG. 1A in the operating position.
Figure 6A:
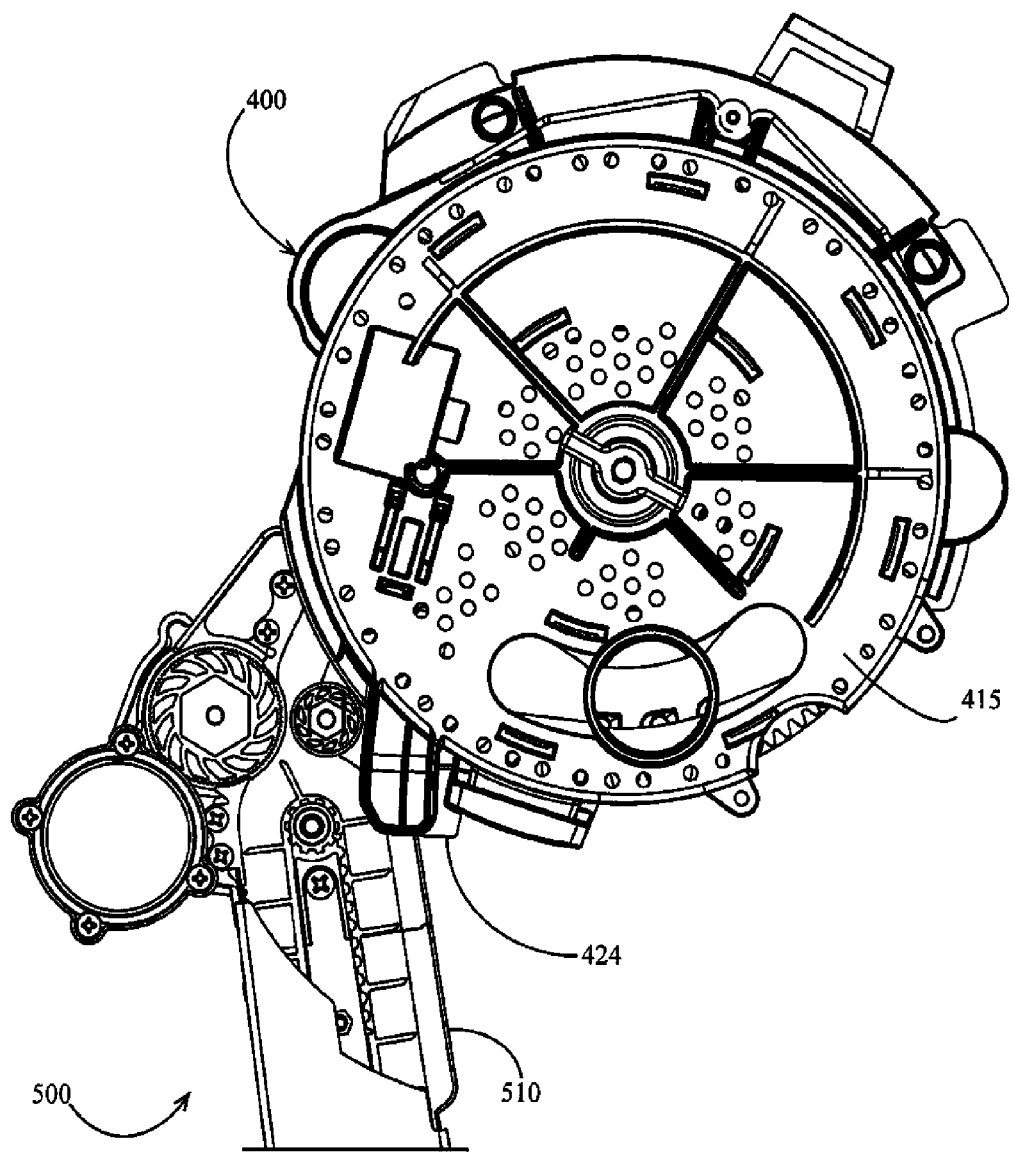
FIG. 6A is a left side elevation view showing a portion of an embodiment of a seed conveyor and an embodiment of a seed meter in a first partially disengaged position corresponding to a first partially disassembled position of the agricultural row unit of FIG. 1A.
Figure 6B:
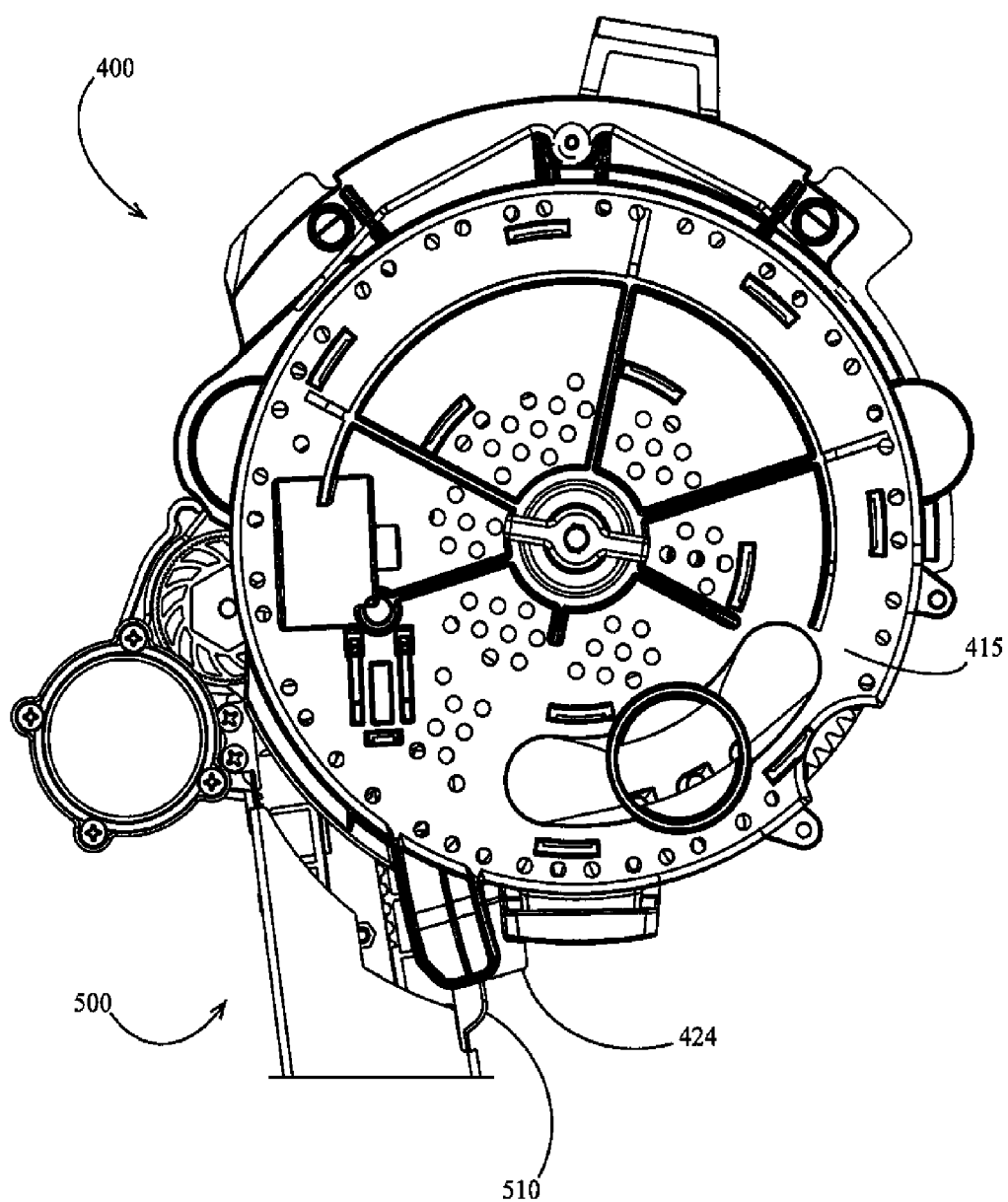
FIG. 6B is a left side elevation view of the seed conveyor and seed meter of FIG. 6A in a second partially disengaged position corresponding to a second partially disassembled position of the agricultural row unit of FIG. 1A.

In some embodiments of the planter 10, the bulk seed hopper 730 is omitted such that the individual hoppers 110 are refilled manually. Additionally, even when a bulk seed hopper 730 is included, the operator is preferably able to configure the system such that the bulk seed hopper is not used. In such embodiments and configurations, the seed supply conduit 220 is preferably configured to be selectively closed, e.g., with a removable cap 222 (FIG. 5).

Conveyor-Meter Engagement and Disengagement

Figure 7A:
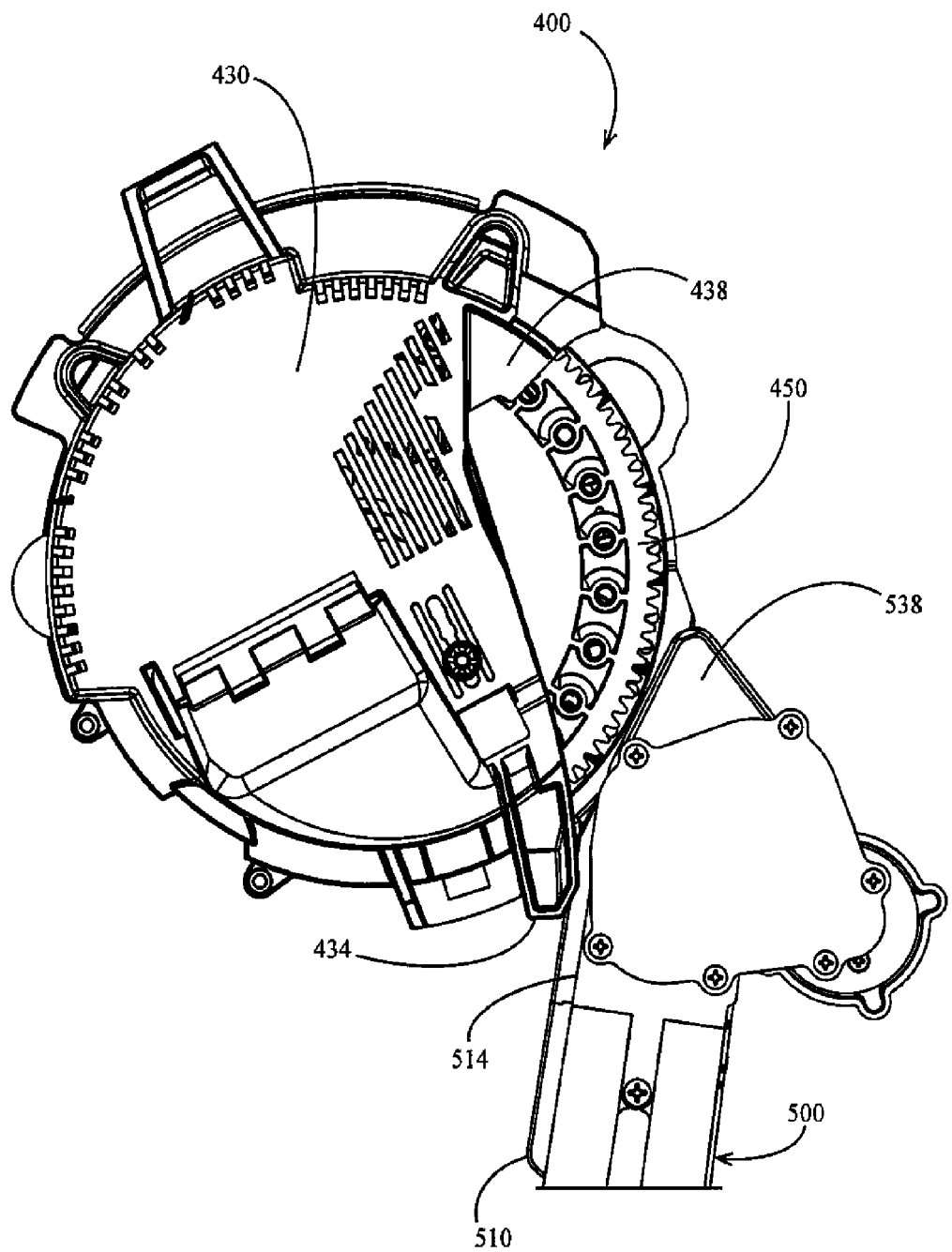
FIG. 7A is a right side elevation view of the seed conveyor and seed meter of FIG. 6A.
Figure 7B:
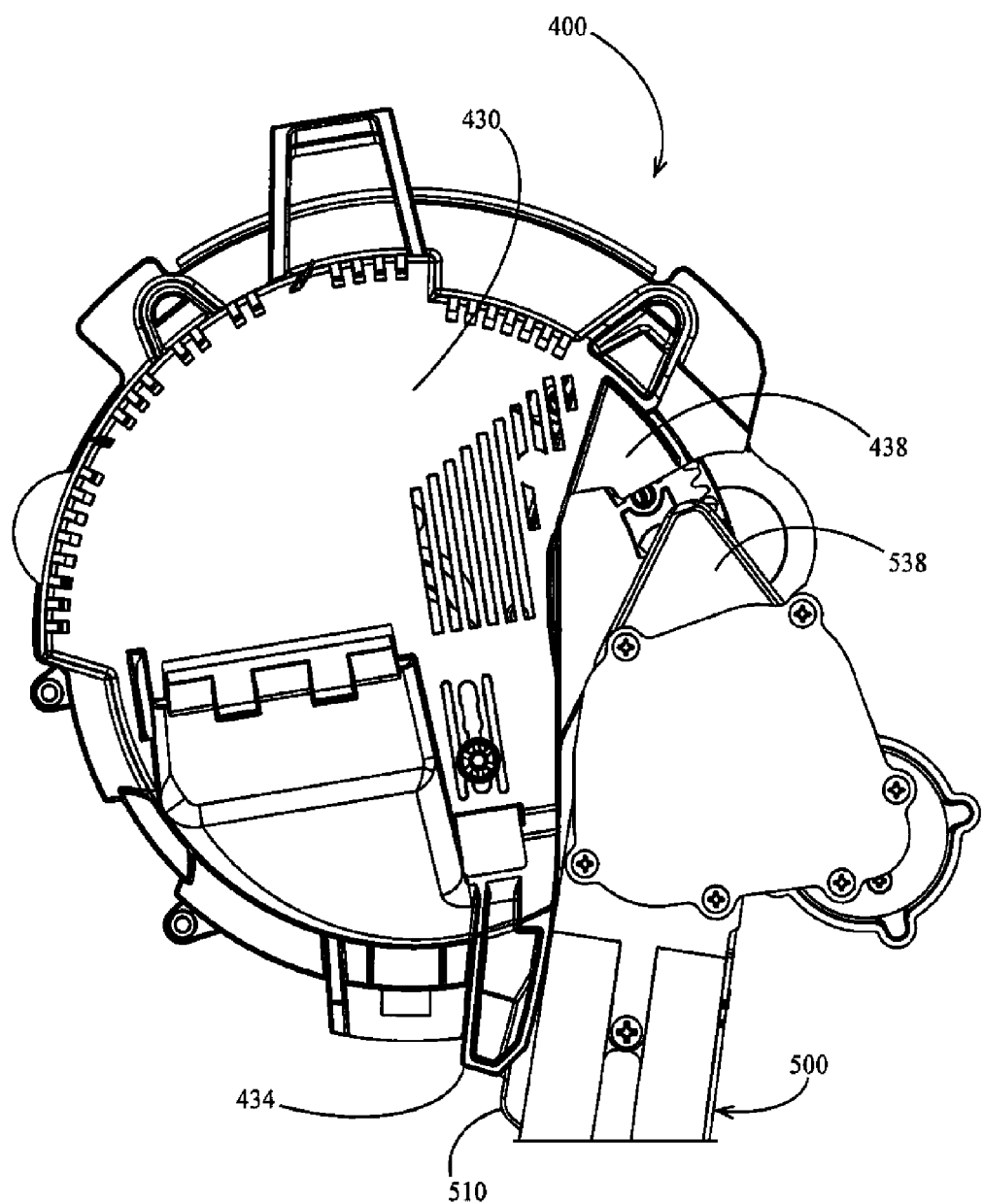
FIG. 7B is a right side elevation view of the seed conveyor and seed meter of FIG. 6B.
Figure 8:
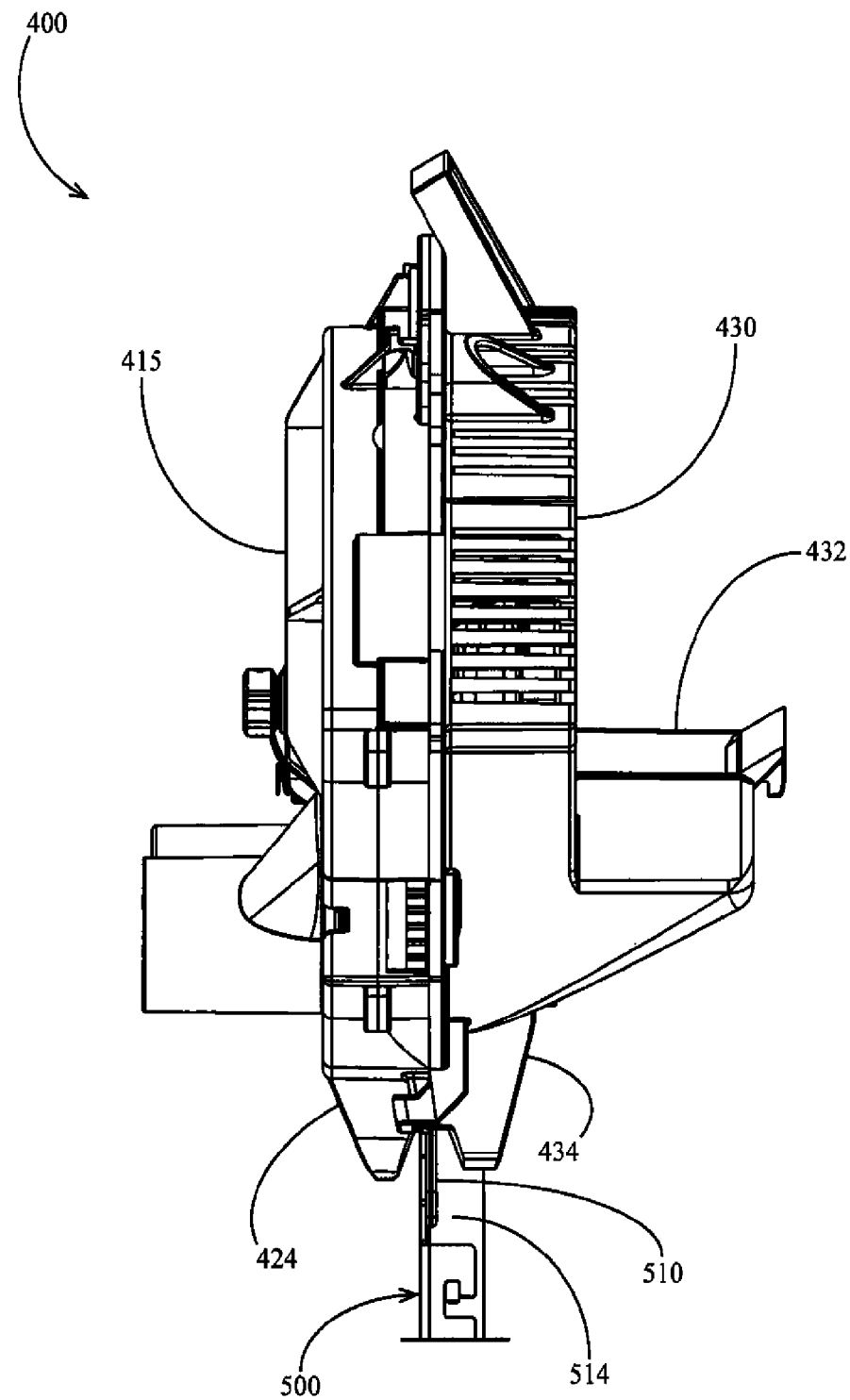
FIG. 8 is a front elevation view of the seed conveyor and seed meter of FIG. 6B.
Figure 9:
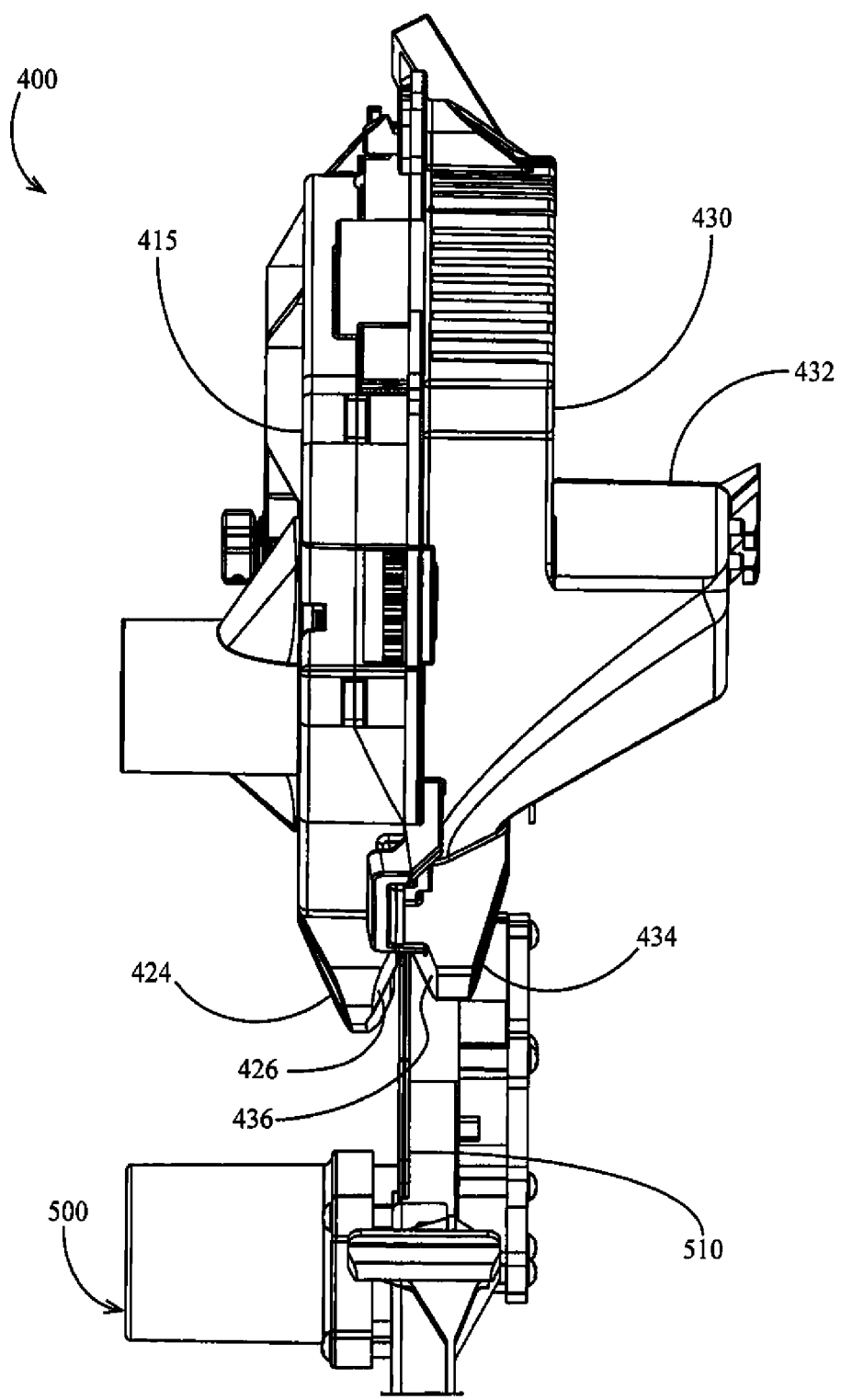
FIG. 9 is an upward perspective view of the seed conveyor and seed meter of FIG. 6A.

Turning to FIGS. 6A through 9, as the hopper 110 is rotated forward into the operating position, the meter 400 preferably releasably engages the seed conveyor 500. It should be appreciated that the position and orientation of the seed conveyor 500 relative to the meter 400 in the operating position is important in establishing successful communication of seeds from a seed disc 450 (FIG. 7A) of the meter to the seed conveyor; however, for ease of removal and installation, the meter and the seed conveyor are preferably engageable and disengageable by simple rotation of the hopper 110. Referring to FIGS. 8 and 9, the meter 400 preferably includes a vacuum housing 415 and a seed housing 430 including a pocket 432 configured to receive seed from the hopper 110. The vacuum housing 415 preferably includes a guide 424 having a guide surface 426. The seed housing 430 preferably includes a guide 434 having a guide surface 436. The seed conveyor 500 preferably includes a vertical alignment fin 510. As the hopper 110 is rotated forward into the operating position, the guide surfaces 426,436 guide the fin 510 between the guides 424,434. In the operating position, the guides 424,434 constrain the transverse position (the left-right position on the view of FIG. 8) of the seed conveyor 500 relative to the meter 400 as well as the vertical orientation of the seed conveyor (along a plane normal to the page in FIG. 8) such that seeds are effectively communicated from the seed conveyor to the meter.

Comparing FIG. 6A to FIG. 6B and FIG. 7A to FIG. 7B, the meter 400 is illustrated in two positions as the hopper 110 is rotated forward, progressively engaging the meter with the seed conveyor 500. Referring to FIGS. 7A and 7B, the seed conveyor 500 preferably includes a protrusion 538 at an upper end, and the seed housing 430 of the meter 400 preferably includes a corresponding pocket 438 configured to receive the protrusion 538. As best illustrated in FIG. 4A, in the operating position the pocket 438 retains the fore-aft position (the left-right position on the view of FIG. 7B) of the seed conveyor 500 relative to the meter and limits the upward vertical movement of the seed conveyor relative to the meter.

In order to allow the seed conveyor 500 to be guided into the desired position by the meter 400, the seed conveyor is preferably flexibly mounted to the row unit frame 120. In order to maintain the seed conveyor 500 in the desired position relative to the meter 400, the seed conveyor is preferably resiliently mounted and biased toward engagement with the meter 400. As illustrated in FIGS. 10A and 10B, the seed conveyor 500 is preferably supported by a spring 160. The spring 160 is preferably pivotally supported by a post 121 within the row unit frame 120. Counter-clockwise rotation of the spring 160 (on the view of FIG. 10) is preferably limited by contact of a rearward end of the spring with the row unit frame 120. The seed conveyor 500 preferably includes a mounting tab 560 which rests in an aperture in the spring 160, fixing the position and orientation of the seed conveyor relative to the aperture. When the only other force acting on the seed conveyor 500 is gravity (acting vertically on the view of FIG. 10), the spring 160 is preferably configured to resiliently retain the seed conveyor 500 in a natural position slightly above and slightly forward of the position in which the seed conveyor is fully engaged with the meter 400. The spring 160 is preferably configured to impose an upward biasing force Fby on the seed conveyor 500 when the meter 400 imposes a downward force on the seed conveyor. The spring 160 is preferably configured to impose a rearward biasing force Fbx on the seed conveyor 500 when the meter 400 imposes a forward force on the seed conveyor. Such a forward force is imposed, e.g., by the guide 434 on a surface 514 of the seed conveyor adjacent to the guide fin 510 (FIG. 8). Thus in the operating position, the spring 160 biases the seed conveyor 500 against the meter 400 such that the position of the seed conveyor relative to the meter is resiliently maintained. Moreover, as the hopper 110 is rotated rearward and the seed conveyor 500 returns to its natural position, the meter 400 disengages from the seed conveyor without the use of tools.

Figure 14:
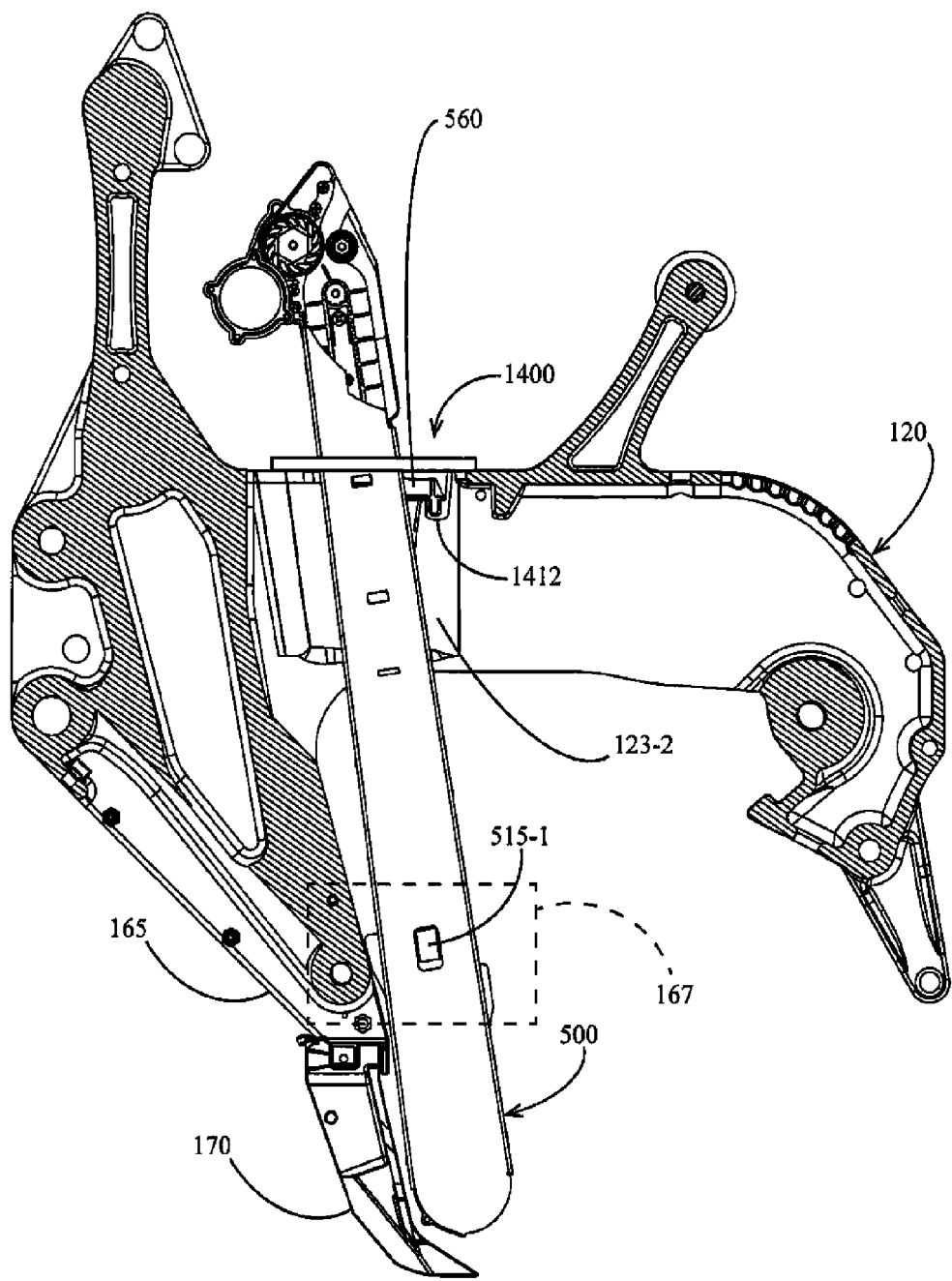
FIG. 14 is a view of the agricultural row unit of FIG. 1A along the section 10-10 of FIG. 5, in which a spring is replaced with an embodiment of a spring mount.
Figure 15A:
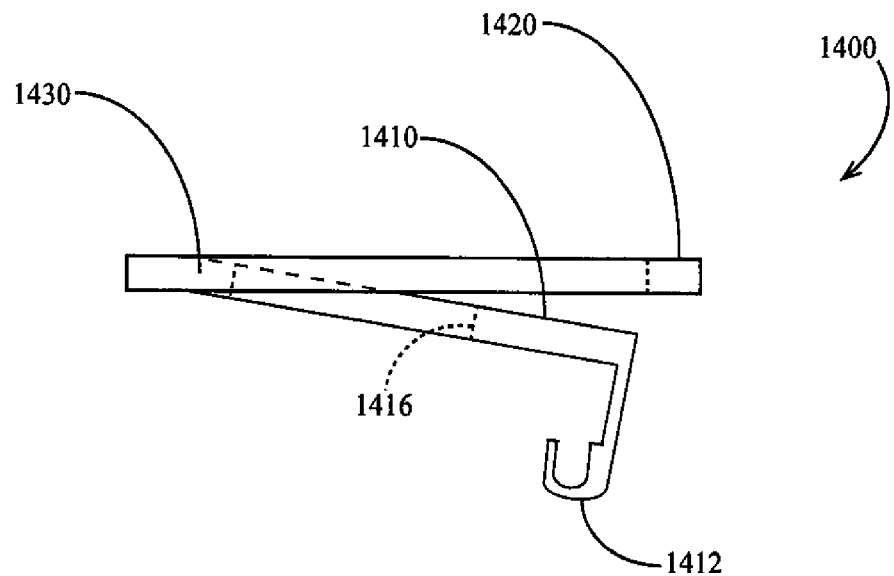
FIG. 15A is a side elevation view of the spring mount of FIG. 14 in a deflected position.
Figure 15B:
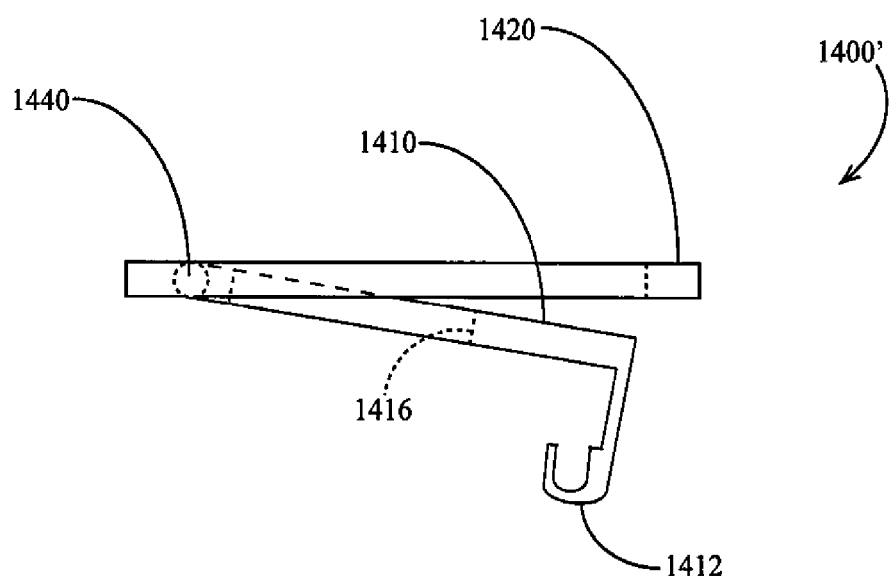
FIG. 15B is a side elevation view of another embodiment of a spring mount in a deflected position.

In the alternative embodiments illustrated in FIGS. 14-15B, the spring 160 is replaced with a spring mount 1400. The spring mount 1400 preferably includes a rim 1420 sized to rest on the row unit frame and a center portion 1410 resiliently displaceable relative to the rim, to a downwardly deflected position such as that illustrated in FIGS. 15A and 15B. In the embodiment of FIG. 15A, the center portion 1410 displaces with respect to the rim 1420 by bending of a joint 1430; the joint 1430 preferably biases the center portion toward a position parallel to the rim 1420 (illustrated in FIG. 14). In the embodiment of spring mount 1400' of FIG. 15B, the center portion 1410 displaces with respect to the rim 1420 by deflection of a coil spring 1440; in this embodiment the center portion 1410 is pivotally mounted to the rim 1420 and the coil spring 1440 biases the center portion toward a position parallel to the rim 1420 (illustrated in FIG. 14). The center portion 1410 preferably includes an opening 1416 sized allow a lower portion of the seed conveyor 500 to pass therethrough. The center portion 1410 preferably includes (or has mounted thereto) a downwardly extending hook 1412 configured to releasably engage the mounting tab 560 of the seed conveyor 500. In an installation phase, the operator preferably places the spring mount 1400 on the row unit frame 120 above an opening formed by sidewalls 123; the operator then preferably slides the lower portion of the seed conveyor 500 downward through the opening 1416 until the hook 1412 engages the mounting tab 560. Thus in operation, the spring mount 1400 supports the seed conveyor 500 and biases the seed conveyor vertically upward for resilient engagement with the seed meter.

Seed Tube Embodiments

Figure 12A:
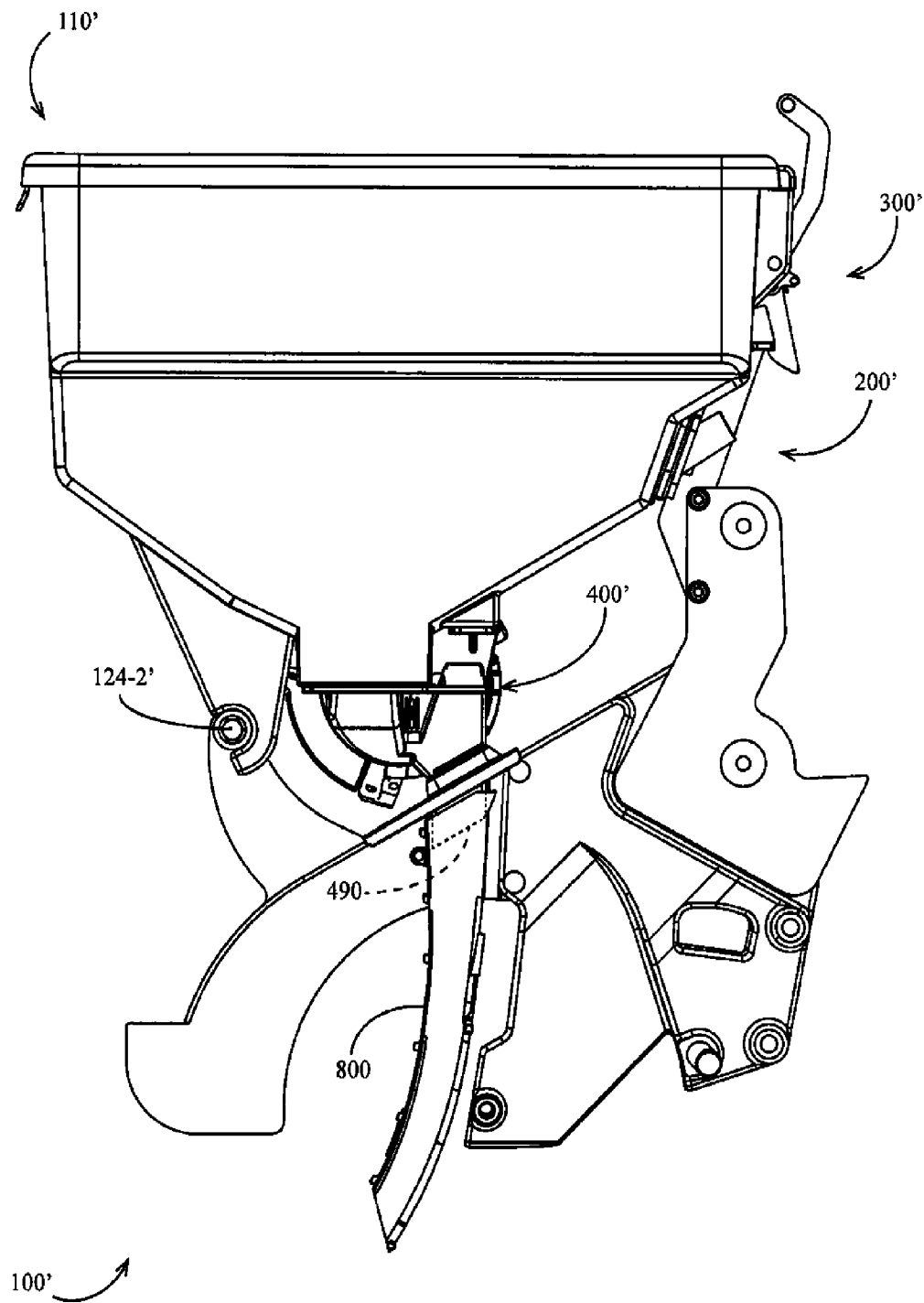
FIG. 12A is a partial right side elevation view of another embodiment of an agricultural row unit including a seed tube.
Figure 12B:
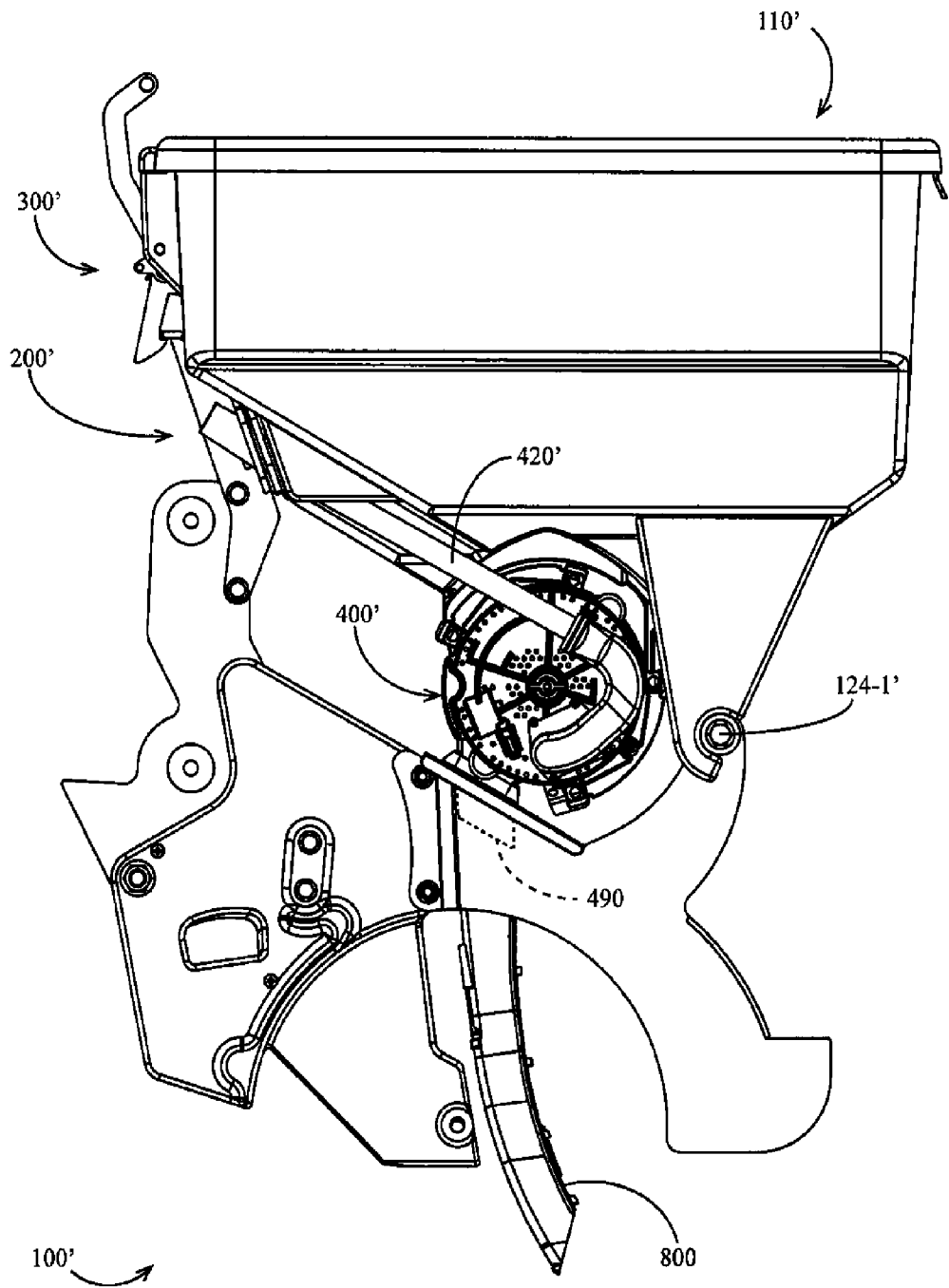
FIG. 12B is a left side elevation view of another embodiment of the agricultural row unit of FIG. 12A.
Figure 12C:
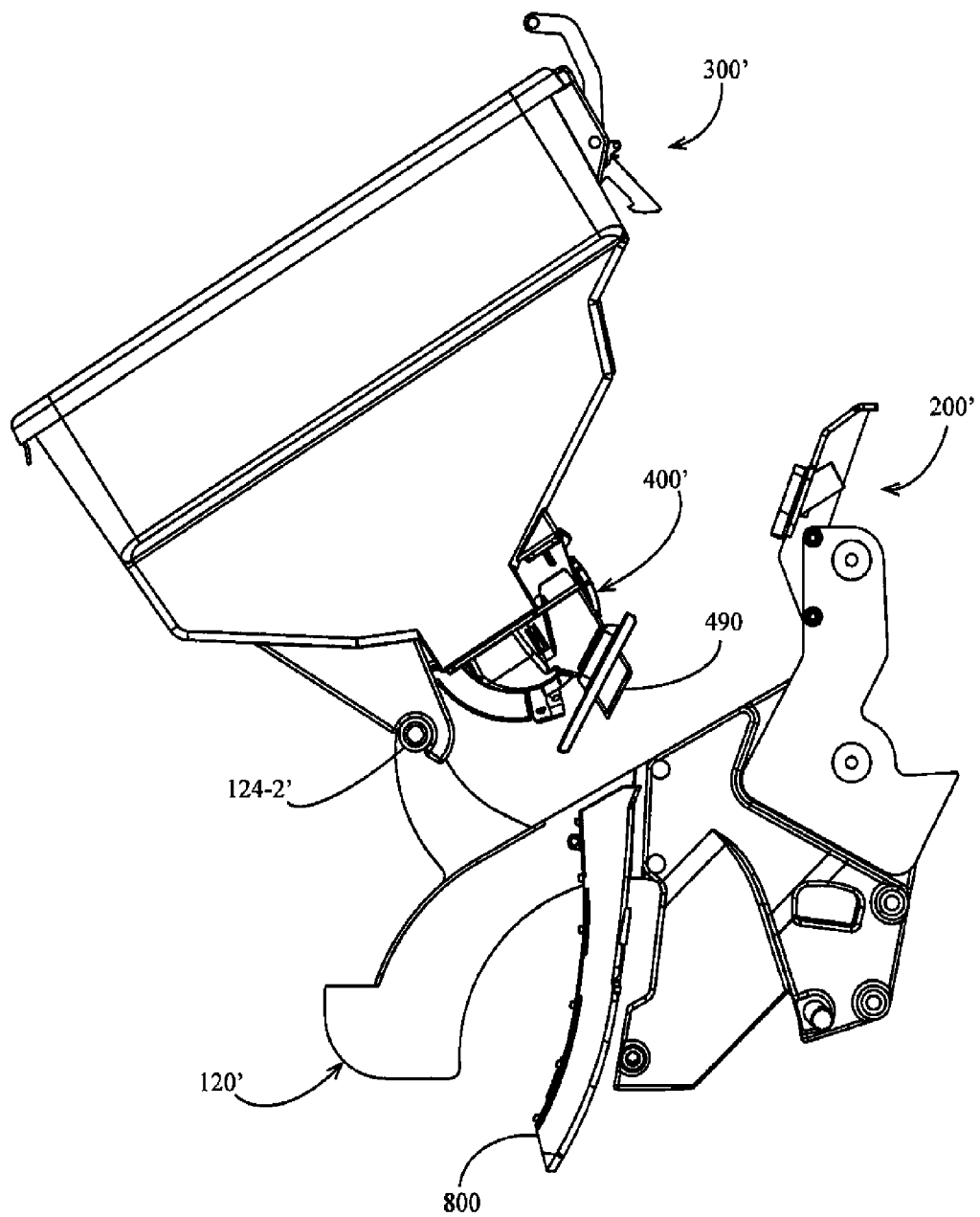
FIG. 12C is a partial right side elevation view the agricultural row unit of FIG. 12A in a partially disassembled position.
Figure 13:
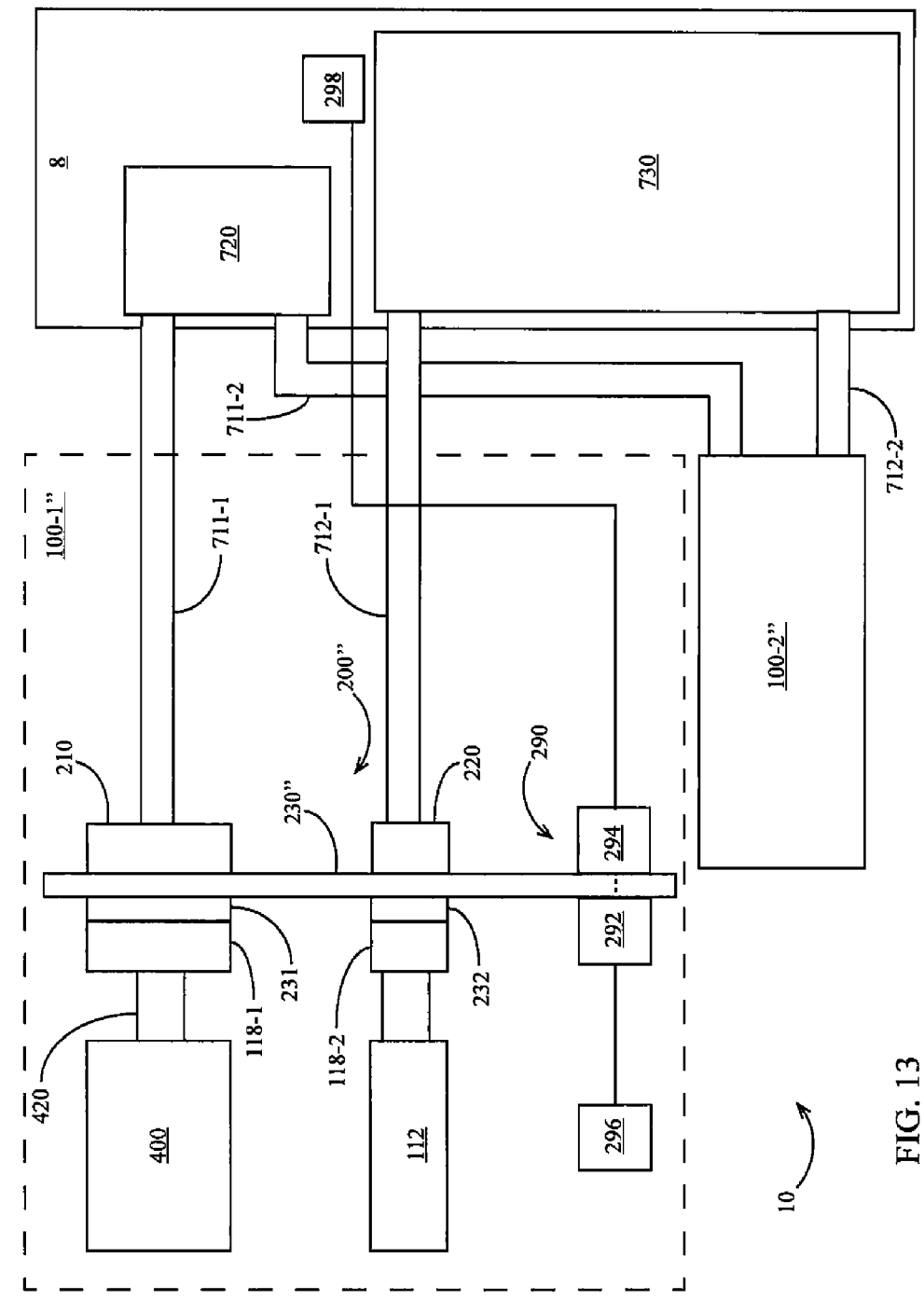
FIG. 13 schematically illustrates another embodiment of a planter 10 including a separable electrical connector.

Turning to FIGS. 12A through 12C, a modified row unit 100' having a seed tube 800 instead of a seed conveyor is illustrated. The row unit 100' includes a modified hopper 110' configured to releasably engage a coupler assembly 200'. When a latch 300' is released, the hopper 110' is removed by rearward rotation (counter-clockwise on the perspective of FIG. 12A) about pivots 124'. The row unit 100' preferably includes a modified seed meter 400' mounted to the hopper 110'. The meter 400' is preferably in fluid communication with a vacuum source via a modified vacuum line 420' and the coupling assembly 200'. The seed meter 400' preferably includes an adapter funnel 490 configured to engage the seed tube 800 (e.g., enter an upper end of the seed tube 800) as the hopper 110' is rotated into the operating position. The adapter funnel 490 thus establishes seed communication between the meter 400 and the seed tube 800. In the operating position, seeds are delivered from the meter 400' to the seed tube 800 via the adapter funnel 490. The adapter funnel 490 is preferably configured to disengage from the seed tube 800 when the hopper 110' is rotated rearward.

It should be appreciated that in some implementations, the user may prefer to use the same planter 10 to plant with seed tubes and seed conveyors. For example, the user may prefer to plant certain crops (e.g., corn) with a seed conveyor and other crops (e.g., smaller-seed crops) with a seed tube. Thus the same hopper 110 is preferably configured to operably support either the meter 400 or the modified meter 400'. Additionally, the same row unit frame 120 is preferably configured to support either the seed conveyor 500 or the seed tube 800.

Alternative Coupler Assembly Embodiments

Turning to FIG. 12, a modified row unit 100" is schematically illustrated having a separable electrical connector 290. The connector 290 preferably comprises a plug 292 mounted to the hopper 110 and a socket 294 mounted to a modified coupler assembly 200". The plug 292 is in electrical communication with a seed sensor 296 disposed to detect passage of seeds through the seed conveyor 500. The socket 294 is preferably in electrical communication with a processor 298.

The coupler assembly 200" preferably includes a modified coupler frame 230" having an opening permitting engagement of the plug 292 and the socket 294. As the hopper 110 is rotated into the operating position, the plug 292 engages the socket 294 such that the plug is in electrical communication with the socket. Thus in the operating position, the processor 298 is in electrical communication with the seed sensor 296 via the connector 290. When the hopper 110 is rotated rearward for removal of the hopper, the plug 292 separates from the socket 294. In other embodiments, the coupler assembly 200" includes further separable connectors 290 by which power is supplied to the seed conveyor 500 and the seed meter 400.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. An agricultural row unit for depositing seeds into a planting trench, comprising:
   a row unit having a row unit frame;
   a seed hopper pivotally mounted to the row unit frame, said seed hopper pivotable in a direction rearwardly away from a forward direction of travel of the row unit frame from a first position to a second position;
   a seed meter in seed communication with said seed hopper; and
   a seed conveyor configured to convey seeds from said seed meter to the planting trench;
   wherein in said first position, said seed meter is in seed communication with said seed conveyor; and
   wherein in said first position, said seed meter is in communication with a vacuum supply conduit; and
   wherein in said second position, said seed meter is separated from said vacuum supply conduit.

2. The agricultural row unit of claim 1, wherein in said second position, said seed meter is disposed to be removed from said seed hopper without contacting said seed conveyor.

3. The agricultural row unit of claim 1, wherein in said first position, said seed conveyor is resiliently engaged with said seed meter.

4. The agricultural row unit of claim 1, wherein in said first position, said seed conveyor is biased into contact with said seed meter.

5. The agricultural row unit of claim 1, further including:
   a loading wheel, wherein said loading wheel urges seeds from said seed meter into said seed conveyor.

6. The agricultural row unit of claim 1, wherein said seed meter includes a meter alignment guide, wherein said seed conveyor includes a conveyor alignment guide, wherein said meter alignment guide is configured to engage said conveyor alignment guide, wherein said meter alignment guide is disposed to engage said conveyor alignment guide in said first position.

7. The agricultural row unit of claim 1, further comprising:
   a spring mounted to said row unit frame, said spring resiliently supporting said seed conveyor, wherein said spring biases said seed conveyor toward engagement with said seed meter.

8. The agricultural row unit of claim 1, wherein in said first position, said seed hopper is in communication with a seed supply conduit, and wherein in said second position, said seed hopper is separated from said seed supply conduit.

9. A method for connecting an agricultural row unit to a seed supply, comprising:
   mounting a seed meter to a pivot point on a frame of the row unit;
   rotating said seed meter about said pivot point in a direction toward a forward direction of travel of the agricultural row unit until said seed meter is in a first position in which said seed meter is in seed communication with a seed conveyor associated with the row unit; and
   conveying seeds from said seed meter.

10. The method of claim 9, further comprising:
    rotating said seed meter about said pivot point in a direction rearwardly away from a forward direction of travel of the row unit until said seed meter is in a second position in which said seed meter is not in seed communication with said seed conveyor, wherein in said second position, said seed meter is disposed to be removed from the row unit without contacting said seed conveyor.

11. The method of claim 9, wherein in said first position, said seed conveyor is resiliently engaged with said seed meter.

12. The method of claim 9, wherein in said first position, said seed conveyor is biased into contact with said seed meter.

13. The method of claim 9, further including:
    a loading wheel, wherein said loading wheel urges seeds from said seed meter into said seed conveyor.

14. The method of claim 9, wherein said seed meter includes a meter alignment guide, wherein said seed conveyor includes a conveyor alignment guide, wherein said meter alignment guide is configured to engage said conveyor alignment guide, wherein said meter alignment guide is disposed to engage said conveyor alignment guide in said first position.

15. The method of claim 9, further comprising:
    a spring mounted to said row unit, said spring resiliently supporting said seed conveyor, wherein said spring biases said seed conveyor toward engagement with said seed meter.

16. The method of claim 10, wherein in said first position, the row unit is in communication with a seed supply conduit, and wherein in said second position, the row unit is separated from said seed supply conduit.

17. The method of claim 10, wherein in said first position, the row unit is in communication with a vacuum supply conduit, and wherein in said second position, the row unit is separated from said vacuum supply conduit.

18. An agricultural row unit for depositing seeds into a planting trench, comprising:
    a row unit having a row unit frame;
    a seed hopper pivotally mounted to the row unit frame, said seed hopper pivotable in a direction rearwardly away from a forward direction of travel of the row unit frame a first position to a second position;
    a seed meter in seed communication with said seed hopper; and
    a seed conveyor configured to convey seeds from said seed meter to the trench;
    wherein in said first position, said seed meter is in seed communication with said seed conveyor; and
    wherein in said first position, said seed hopper is in communication with a seed supply conduit; and
    wherein in said second position, said seed hopper is separated from said seed supply conduit.

19. The agricultural row unit of claim 18, wherein in said second position, said seed meter is disposed to be removed from said seed hopper without contacting said seed conveyor.

20. The agricultural row unit of claim 18, wherein in said first position, said seed conveyor is resiliently engaged with said seed meter.

21. The agricultural row unit of claim 18, wherein in said first position, said seed conveyor is biased into contact with said seed meter.

22. The agricultural row unit of claim 18, further including:
   a loading wheel, wherein said loading wheel urges seeds from said seed meter into said seed conveyor.

23. The agricultural row unit of claim 18, wherein said seed meter includes a meter alignment guide, wherein said seed conveyor includes a conveyor alignment guide, wherein said meter alignment guide is configured to engage said conveyor alignment guide, wherein said meter alignment guide is disposed to engage said conveyor alignment guide in said first position.

24. The agricultural row unit of claim 18, further comprising:
   a spring mounted to said row unit frame, said spring resiliently supporting said seed conveyor, wherein said spring biases said seed conveyor toward engagement with said seed meter.

25. The agricultural row unit of claim 18, wherein in said first position, said seed meter is in communication with a vacuum supply conduit, and wherein in said second position, said seed meter is separated from said vacuum supply conduit.

* * * * *